(12) United States Patent
Kannan et al.

(10) Patent No.: US 12,328,224 B2
(45) Date of Patent: Jun. 10, 2025

(54) ASSOCIATION OF DEVICES TO A SENSING DEVICE CONTROL SYSTEM

(71) Applicant: ARRIS Enterprises LLC, Suwanee, GA (US)

(72) Inventors: Navneeth N. Kannan, Doylestown, PA (US); Jay Chambers, Rogers, AR (US); Cesar A. Moreno, Santa Rosa Beach, FL (US); Ganesh Nagarajan, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/124,039

(22) Filed: Mar. 21, 2023

(65) Prior Publication Data

US 2023/0336412 A1    Oct. 19, 2023

Related U.S. Application Data

(60) Provisional application No. 63/330,385, filed on Apr. 13, 2022.

(51) Int. Cl.
*H04L 41/0806* (2022.01)
*H04L 67/12* (2022.01)
*H04L 67/51* (2022.01)

(52) U.S. Cl.
CPC .......... *H04L 41/0806* (2013.01); *H04L 67/51* (2022.05); *H04L 67/12* (2013.01)

(58) Field of Classification Search
CPC ..... H04L 41/0806; H04L 67/51; H04L 67/12; H04L 41/0803; H04L 63/0263; H04L 63/08; H04L 63/102; H04L 63/12; H04L 41/0866; H04W 12/06; G06V 10/95; G06F 2218/02
See application file for complete search history.

(56) References Cited

U.S. PATENT DOCUMENTS 10,044,714 B1 * 8/2018 Gan .................... H04L 63/10
10,721,208 B2 * 7/2020 Liu .................... H04L 67/10
(Continued)

FOREIGN PATENT DOCUMENTS

WO    2022/051289    3/2022

OTHER PUBLICATIONS

International Search Report and Written Opinion issued Jun. 21, 2023 in International Application No. PCT/US2023/015723.
(Continued)

*Primary Examiner* — Tonia L Dollinger
*Assistant Examiner* — Linh T. Nguyen
(74) *Attorney, Agent, or Firm* — Wenderoth, Lind & Ponack, L.L.P.

(57) ABSTRACT

A portal system provides a validation of a connection request prior to establishing a connection to a device associated with user. The connection request is received by the portal system and validated against a device model and/or a device instance list based one or more supported entitlements and an instance of the device in the device instance list. Information about the device can be found in the device model list and used by the device instance list to create a policy associated with the device. One or more provisioning requirements of the device model list provide a relationship that can be used by the device model list for the policy associated with the device.

20 Claims, 10 Drawing Sheets

(56) References Cited

U.S. PATENT DOCUMENTS

| | | | |
|---|---|---|---|
| 11,593,526 B1* | 2/2023 | Mensch | G06F 21/73 |
| 11,671,829 B1* | 6/2023 | Radhakrishnan | H04L 63/0823 |
| | | | 713/156 |
| 2009/0073991 A1* | 3/2009 | Landrum | A61B 5/0809 |
| | | | 370/400 |
| 2012/0105214 A1* | 5/2012 | Sanders | H04L 67/63 |
| | | | 455/466 |
| 2014/0143137 A1* | 5/2014 | Carlson | G06Q 20/18 |
| | | | 705/39 |
| 2015/0081837 A1* | 3/2015 | Bernier | H04W 4/80 |
| | | | 709/217 |
| 2015/0169864 A1* | 6/2015 | Lin | H04L 63/20 |
| | | | 726/6 |
| 2015/0222632 A1* | 8/2015 | Ichijo | G06F 21/30 |
| | | | 726/7 |
| 2015/0271022 A1* | 9/2015 | Seligson | H04W 60/04 |
| | | | 370/254 |
| 2016/0212099 A1 | 7/2016 | Zou et al. | |
| 2016/0337787 A1* | 11/2016 | Palin | H04W 4/50 |
| 2018/0035292 A1* | 2/2018 | Soundararajan | H04W 12/06 |
| 2018/0184464 A1 | 6/2018 | Fang | |
| 2018/0219958 A1* | 8/2018 | Bernstein | H04L 41/0893 |
| 2018/0338242 A1* | 11/2018 | Li | H04W 12/041 |
| 2019/0201122 A1 | 7/2019 | Shelton, IV et al. | |
| 2019/0319939 A1* | 10/2019 | Hamel | G06F 21/33 |
| 2020/0076896 A1* | 3/2020 | Anumala | H04W 4/70 |
| 2020/0145409 A1* | 5/2020 | Pochuev | H04L 63/0853 |
| 2021/0029202 A1* | 1/2021 | Banerjee | H04W 4/00 |
| 2021/0326858 A1* | 10/2021 | Smith | G06Q 20/3674 |
| 2021/0336962 A1* | 10/2021 | Mulampaka | H04L 63/0853 |
| 2022/0092053 A1* | 3/2022 | Papernik | G06F 16/2365 |
| 2022/0317827 A1* | 10/2022 | Paramasivan | G06F 3/0481 |
| 2022/0345464 A1* | 10/2022 | Davenport | H04L 63/0861 |
| 2023/0195858 A1* | 6/2023 | Shah | G06N 20/00 |
| | | | 726/27 |

OTHER PUBLICATIONS

International Preliminary Report on Patetability dated Oct. 8, 2024 in International (PCT) Application No. PCT/US2023/015723.

* cited by examiner

ASSOCIATION OF DEVICES TO A SENSING DEVICE CONTROL SYSTEM

BACKGROUND

Wireless in general, and Wi-Fi (wireless fidelity) in particular have become ubiquitous in networking environments such that many devices that previously relied on manual readouts and displays also provide the same information over wireless technologies. This is even more important as there is a concomitant availability of software applications that run on wireless devices (such as mobile phones) that can read the data and provide useful information to the end-user, for example, via a mobile application. For example, as healthcare costs continue to increase, there is an increasing desire with aging adults to stay in place (in home) for extended care services, such as using wirelessly connected network devices, such as medical devices, to transmit diagnostic results to a software application or a gateway. While there are many individual technologies to address niche problems, given the rapid rise of connectivity technologies and the use of Artificial Intelligence techniques for predictive and analytical methods, these technologies can be confusing and difficult to configure making ubiquitous adoption of a particular technology unlikely. Additionally, services and users are increasingly requiring a visual interface with each other so that a user can be monitored remotely. Further, the lack of standards and restrictions increases the potential occurrence of inappropriate or accidental associations of a network device. Thus, there is a need for a more robust, cloud-based approach that accommodates multiple-modes of sensory data to monitor and control association of a network device, access to the sensory data of the network device, and the user utilizing multiple protocols and redundant data paths while addressing security and privacy concerns associated with the sensory data including validating network devices prior to association or admission to the network and providing an on-demand visual interface between users.

SUMMARY

Generally, there are many devices in the market that operate or behave as point solutions for specific monitoring of aspects associated with a user. Each solution may have an associated device and an associated application that runs on the associated device. However, these solutions or technologies can require different protocols and solution-specific applications and/or devices. Further, these solutions may not be operable with other solutions or technologies already in use by a user. Accumulating and/or analyzing the data or information from these various solutions or technologies can be daunting and thus not implementable by a user especially when the data is particular sensitive giving rise to security and privacy concerns. According to aspects of the present disclosure there are provided novel solutions for providing security, managing and controlling data associated with a user, for example, one or more biometrics or any other sensory data. These novel solutions allow for accommodation of multiple solutions and technologies such that the data associated with the user can be managed and controlled for use by designated or particular individuals to ensure accuracy, security and privacy of the data. For example, aggregating various data from multiple sensing devices can provide a medical or care staff the information needed to address the well-being of a particular user based on one or more profile configurations that ensure that only authorized or verified users and/or network devices can access the data. In this way, the data is kept secure and privacy is ensured.

Additional security concerns are prompted by the widespread use of wireless connectivity of sensor devices, especially when those sensor devices provide biometric data of an associated user. For example, a blood pressure monitor, in addition to displaying data locally, can transmit the data to a network resource or other network device, such as a mobile phone or a personal health gateway (PHG). However, problems arise when no restrictions or standards are in place to control or monitor the association of the sensor device with another network device. For example, a multiple unit environment, such as an assisted living facility, an apartment, a multiple-dwelling site, a communal gathering site, any other plurality of users environment, or any combination thereof, given the range of wireless connectivity (for example, Bluetooth, Bluetooth Low Energy, etc.) and the potential of network devices that can be associated or otherwise paired either accidentally or otherwise, there is a possibility that an access point device can be associated with an inappropriate, incorrect, unrelated, or otherwise non-suitable network device or even with a plurality of the same or similar network devices causing confusion or inaccurate data analysis results (for example, received data cannot be accurately associated with a corresponding user). Traceability and verifiability of data received from a network device becomes questionable under these circumstances where associations are not properly monitored or controlled.

A novel solution provides a sensing device control system, such as any of a PHG, a mobile device, a set-top box, any other network device capable of receiving data from one or more network devices, or any combination thereof, and that securely and accurately manages data, such as any of maintain, monitor, receive, process, otherwise handle, or any combination thereof data, from one or more sources, such as one or more network devices, one or more network resources, or both. A sensing device control system provides a service for managing this data by, for example, utilizing a pairing service to connect to one or more Bluetooth or Bluetooth low-energy (BLE) network devices, such as one or more sensor devices. The sensing device control system can communicate with a network resource to any of store data, process data, monitor data, facilitate communications with one or more users (such as any of one or more persons, one or more network devices, one or more entities, or any combination thereof), otherwise handle data, or any combination thereof. In this way, data from one or more network devices, such as one or more sensor devices (for example, one or more medical devices or equipment) can be securely and accurately manage data associated with a user, such as a patient or network device.

An aspect of the present disclosure provides a portal system for validating a request for association of a device. The device comprises a memory storing one or more computer-readable instructions and a processor configured to execute the one or more computer-readable instructions to receive a provisioning request for a device from a sensing device control system, receive from a device instance list a policy associated with an instance of the device, validate the request for association of the device, and send the validation to the sensing device control system.

In an aspect of the present disclosure, the processor is further configured to execute the one or more instructions to receive at a device model list one or more provisioning requirements associated with a device, and wherein the validating the request is based on the one or more provisioning requirements.

In an aspect of the present disclosure, the one or more provisioning requirements comprises one or more allowed accessories.

In an aspect of the present disclosure, the processor is further configured to execute the one or more instructions to create an instance of the device in the device instance list based on one or more provisioning requirements received from an instance management portal.

In an aspect of the present disclosure, the processor is further configured to execute the one or more instructions to receive from the sensing device control system a service query, and send a response to the service query to the sensing device control system, wherein the response comprises an updated policy.

In an aspect of the present disclosure, the processor is further configured to execute the one or more computer-readable instructions to receive at a service management portal information associated with one or more supported entitlements, and wherein the policy is based on the one or more supported entitlements.

In an aspect of the present disclosure, the policy indicates one or more accessories associated with the instance of the device.

An aspect of the present disclosure provides a method for validating a request for association of a device in a portal system. The method comprises receiving a provisioning request for a device from a sensing device control system, receiving from a device instance list a policy associated with an instance of the device, validating the request for association of the device, and sending the validation to the sensing device control system.

In an aspect of the present disclosure, the method further comprises receiving at a device model list one or more provisioning requirements associated with a device, and wherein the validating the request is based on the one or more provisioning requirements.

In an aspect of the present disclosure, the method is such that the one or more provisioning requirements comprises one or more allowed accessories.

In an aspect of the present disclosure, the method further comprises creating an instance of the device in the device instance list based on one or more provisioning requirements received from an instance management portal.

In an aspect of the present disclosure, the method further comprises receiving from the sensing device control system a service query, and sending a response to the service query to the sensing device control system, wherein the response comprises an updated policy.

In an aspect of the present disclosure, the method further comprises receiving at a service management portal information associated with one or more supported entitlements, and wherein the policy is based on the one or more supported entitlements.

In an aspect of the present disclosure, the method such that the policy indicates one or more accessories associated with the instance of the device.

An aspect of the present disclosure provides a portal system storing one or more computer-readable instructions for validating a request for association of the portal system. The one or more computer-readable instructions when executed by a processor of the portal system, cause the portal system to perform one or more operations including the steps of the methods described above.

Thus, according to various aspects of the present disclosure described herein, it is possible to provide a sensing device management system for provisioning of one or more devices, such as one or more sensing devices so as to prevent, for example, a device from inadvertently or maliciously being associated with a user, such as a user of a sensing device control system. The novel solution(s) provides the sensing device management system that includes a portal system, a service provider management system, and a sensing device control system. The portal system can validate a request for association of a device so that the device can only be associated with the corresponding user or a location, such as a user in a multi-dwelling facility.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
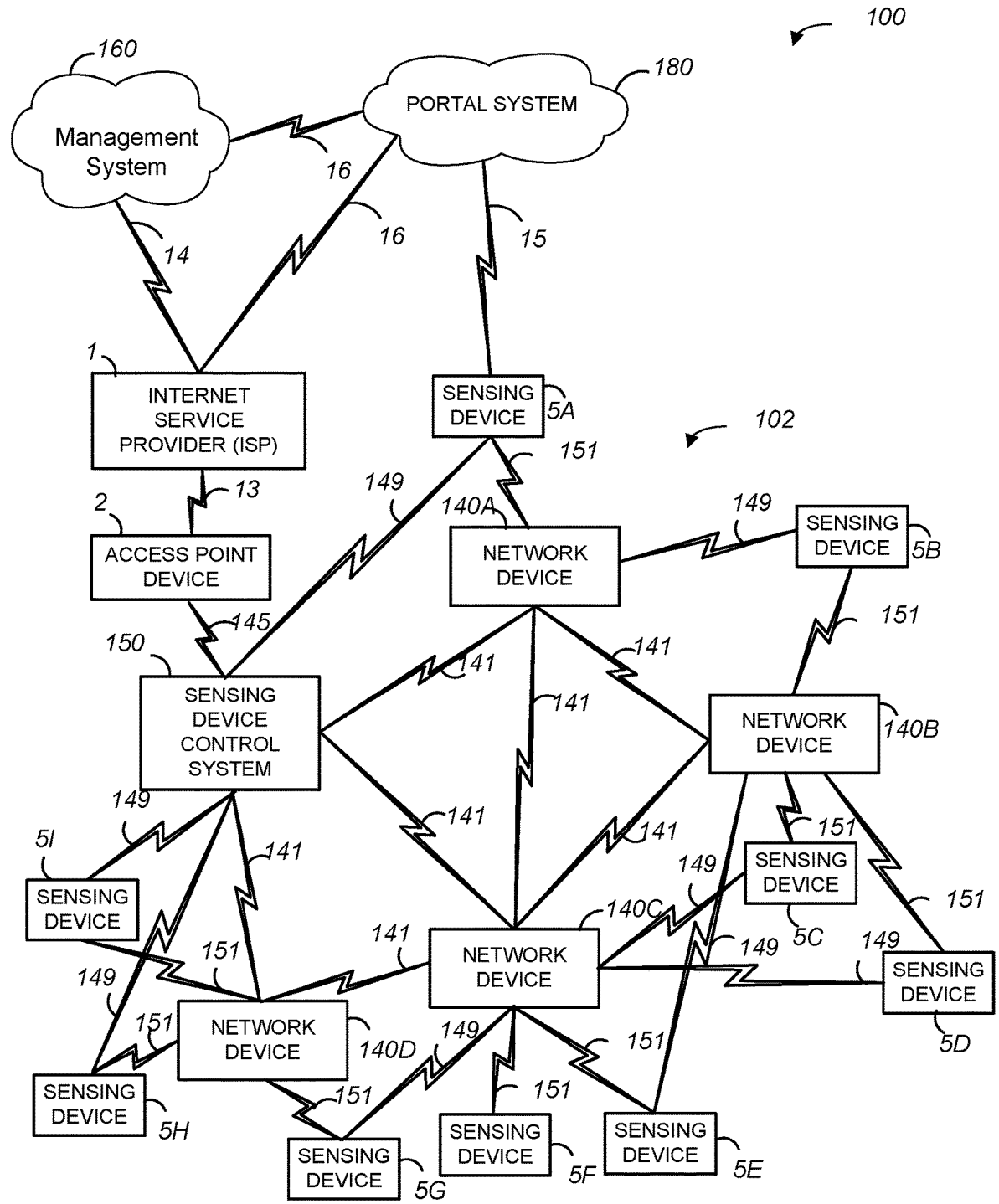
FIG. 1 is a schematic diagram of a sensing device management system for providing management of data from one or more sources, according to one or more aspects of the present disclosure.

FIG. 1 illustrates a schematic diagram of a sensing device management system 100 for providing management of data from one or more sources, according to one or more aspects of the present disclosure. The sensing device management system 100 utilizes various communications protocols, across multiple or redundant data paths to provide a robust, accurate, and secure system for managing data from the one or more sources, for example, to provide aggregation of data associated with a user from multiple network devices and/or network resources. An example sensing device management system 100 can be related to a caregiving network for a user (such as a patient associated with one or more user profiles, one or more user profile configurations, or both) such that one or more aspects associated with the user (for example, biometric data, a visual interface, etc.) can be managed, for example, aggregated and/or monitored, from multiple network devices capable of sensing the one or more aspects. For example, any one or more users, such as in a trusted support network, can establish a visual interface with a particular user based on an authorization for the visual interface. Access to the aggregated and/or monitored data, including the visual interface, can be controlled based on one or more profile configurations.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

As shown in FIG. 1, the main elements of the sensing device management system 100 comprise a network 102, such as a Wi-Fi or other network, that comprises a sensing device control system 150, an access point device 2 connected to a network resource, such as any of a management system 160, a portal system 180, any other cloud storage, repository, server, and/or database, or any combination thereof via an Internet Service Provider (ISP) 1 and also connected to different devices, such as one or more wireless devices and/or one or more network devices, for example, any of one or more wireless extender access point devices, one or more network devices 140A-140D (collectively referred to as network device(s) 140), one or more sensing devices 5A-5I (collectively referred to as sensing device(s) 5), or any combination thereof.

The sensing device management system 100 shown in FIG. 1 comprises wireless devices (for example, extender access point devices 3 and network devices 140) that may be connected in one or more wireless networks (for example, private, guest, iControl, backhaul network, or Internet of things (IoT) network) within a network environment 102. Additionally, there could be some overlap between wireless devices (for example, extender access point devices 3 and network devices 140) in the different networks. That is, one or more devices could be located in more than one network. For example, the extender access point devices 3 could be located both in a private network for providing content and information to a network device 140 and also included in a backhaul network or an iControl network.

A sensing device control system 150 can be connected to one or more sensing devices 5 (for example, any of sensing devices 5A-5I), one or more network devices 140 (for example, any of network devices 140A-D), and any combination thereof. In one or more embodiments, any one or more sensing devices 5 can be included within or as part of the sensing device control system 150, one or more network devices 140, or both. For remote well-being management of associated data, such as monitoring of data associated with a user, the one or more network devices 140 can collect data from a variety of devices (such as a plurality of sources), such as one or more sensing devices 5, with one or more capabilities. The one or more sensing devices 5 can comprise one or more functionalities, one or more capabilities, or both, and/or support one or more protocols, such as one or more methods of communication to one or more networks devices 140, sensing device control system 150, or both. The one or more network devices 140 can comprise a data aggregator that collects data from one or more network devices 140, one or more sensing devices 5, or both and send the collected data to the sensing device control system 150. In one or more embodiments, the sensing device control system 150 can comprise a network device 140, a sensing device 5, or both. To provide coverage for the one or more sensing devices 5 distributed at or about a premises (such as a network 102), a plurality of network devices 140 can be distributed within range of the one or more sensing devices 5 so as to provide resiliency or redundancy in the data aggregation of data collected or received from the one or more sensing devices 5. The network device 140 can comprise any one or more elements as discussed with reference to device 200 of FIG. 2, but with limited connectivity functionality, such as short range wireless protocol functionality. For example, a network device 140 can communicate with the sensing device control system 150 using any one or more short range wireless protocols, a Wi-Fi protocol, any other protocol, or both. A network device 140 can include any of a BLE radio, a ZigBee radio, a long-range (LoRa) radio, any other short range connectivity technology, or any combination thereof for communication to any of one or more sensing devices 5, one or more network devices 140, the sensing device control system 150, or any combination thereof. The network device 140 can also include any of a sensor (such as a sensing device 5), an external power source, associated connectivity software, such as BLE mesh networking software, or any combination thereof. For example, the sensing device control system 150 can connect to one or more network devices 140 via a connection 141, such as a Bluetooth connection. The sensing device control system 150 and/or the one or more network devices 140 can connect to one or more sensing devices 5 via a primary connection 151, a secondary connection 149, or both so as to establish a resilient hybrid topology network. In one or more embodiments, the one or more network devices 140 and the sensing device control system 150 along with associated connections constitute a mesh topology, for example, as discussed with reference to FIG. 3.

The ISP 1 can be, for example, a content provider or any computer for connecting the access point device 2 to a network resource, such as management system 160, and portal system 180, or both. For example, management system 160 can be a cloud-based service that provides access to a cloud-based repository accessible via ISP 1 where the cloud-based repository comprises information associated with or an access requested by any one or more devices of the sensing device management system 100. For example, management system 160 can be a care operator that provides healthcare services via communications with the portal system 180. A user of the management system 160, for example, can be a customer that is an aging-in place elderly person or other patient that receives a sensing device control system 150 along with one or more sensing devices 5. The portal system 180 can provide control, monitoring, aggregation and/or controlling of data and/or one or more actions associated with a user in the network environment 100, such as data collected by any of a sensing device control system 150, one or more network devices, one or more sensing devices 5, or any combination thereof. For example, the portal system 180 can enforce one or more provisioning requirements as discussed with reference to FIGS. 7 and 8 by receiving one or more inputs or data from management system 160 and communication to one or more elements of FIG. 1 via the management system 160. In one or more embodiments, the portal system 180 can communicate with any one or more external repositories via ISP 1 or internal repositories. For example, the portal system 180 can ensure that a sensing device control system 150 only permits association with one or more sensing devices 5 that are verified as being associated with any of a user, a location, the sensing device control system 150, or any combination thereof. In one or more embodiments, any of the devices of network 102 can be directly or indirectly coupled to the portal system 180. The connection 14 between the management system 160 and the ISP 1, the connection 16 between the portal system 180 and the ISP 1, the connection 15 between the portal system 180 and a sensing device 5A, and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

Any of the connections 13, 14, 15, 16, or any combination thereof (collectively referred to as network connections or connections) can further include as some portion thereof a broadband mobile phone network connection, an optical network connection, or other similar connections. For example, any of the network connections can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that any of the network connections are capable of providing connections between a network device and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (e.g., a wireless extender access point devices and one or more network devices 140) in the network 102, or any combination thereof. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connections 141 and 149 between the access point device 2 and one or more network devices 140 and/or one or more sensing devices 5, respectively, can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connections 141 and/or 149 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connections 141 and/or 149 can include connections to a media over coax (MoCA) network. One or more of the connections 141 and/or 149 can also be a wired Ethernet connection. Any one or more of connections 141 and/or 149 can carry information on any of one or more channels that are available for use.

The network devices 140 can comprise, for example, an extender wireless access point device (for example, a wireless hardware electronic devices such as access points (APs), extenders, repeaters, etc. used to extend the wireless network by receiving the signals transmitted by the access point device 2 and rebroadcasting the signals to, for example, any one or more network devices 140, which may be out of range of the access point device 2, rebroadcasting the signals to the access point device 2, or other network devices 140, or both), a sensing device 5, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the network devices 140 can be a television (TV), an IP/QAM set-top box (STB) or a streaming media decoder (SMD) that is capable of decoding audio/video content, and playing over OTT or MSO provided content received through the access point device 2. Further, a network device 4 can be a device that requires configuration by the access point device 2. In one or more embodiments, any one or more network devices 140 can comprise any device associated with a user for interacting with any type of one or more sensing devices 5. For example, the network device 140 can interact with a plurality of sensing devices 5 where each sensing device 5 senses one or more aspects associated with a user, an environment, or both. In one or more embodiments, one or more sensing devices 5 are included within or local to (built-in) the network device 140.

One or more sensing devices 5 can connect to one or more network devices 140, for example, via a connection 151. Connection 151 can utilize any one or more protocols discussed above with respect to connections 149 and/or 145. Any of the one or more sensing devices 5 can comprise or be coupled to an optical instrument (such as a camera, an image capture device, or any other visual user interface device, any device for capturing an image, a video, a multi-media video, or any other type of data, or a combination thereof), a biometric sensor, a biometric tracker, ambient temperature sensor, a light sensor, a humidity sensor, a motion detector (such as, an infrared motion sensor or Wi-Fi motion sensor), a facial recognition system, a medical diagnostic sensor (such as, a pulse oximeter or any other oxygen saturation sensing system, a blood pressure monitor, a temperature sensor, a glucose monitor, etc.), a voice recognition system, a microphone (such as, a far field voice (FFV) microphone) or other voice capture system, any other sensing device, or a combination thereof.

It is contemplated by the present disclosure that the portal system 180, the management system 160, the access point device 2, the network devices 140, and/or the sensing devices 5 include electronic components or electronic computing devices operable to receive, transmit, process, store, and/or manage data and information associated with the network 102, which encompasses any suitable processing device adapted to perform computing tasks consistent with the execution of computer-readable instructions stored in a memory or a computer-readable recording medium (for example, a non-transitory computer-readable medium). In one or more embodiments, the network 102 can be a self-organizing hybrid IoT hub mesh topology for resilient static and mobile sensor data collection. For example, any one or more sensing devices 5 can collect data and send the data via a network device 140 (such as a data aggregator) via a plurality of data paths or connections.

Further, any, all, or some of the computing components in a portal system 180, a management system 160, an access point device 2, a network device 4, and/or a sensing device 5 may be adapted to execute any operating system, including Linux, UNIX, Windows, MacOS, DOS, and ChromOS as well as virtual machines adapted to virtualize execution of a particular operating system, including customized and proprietary operating systems. A portal system 180, a management system 160, an access point device 2, a network device 140, and/or a sensing device 5 are further equipped with components to facilitate communication with other computing devices or devices over the one or more network connections to local and wide area networks, wireless and wired networks, public and private networks, and any other communication network enabling communication in the network 102.

While FIG. 1 illustrates a schematic diagram of a network 102 that includes a hybrid topology that comprises various types of devices, such as one or more sensing devices 5, one or more network devices 140, or both that utilize various communications protocols, across multiple or redundant data paths, the present disclosure contemplates that any type of network architecture can be utilized. For example, the sensing device control system 150 is connected to the access point device 2 via an extender access point device. The sensing device control system 150 can comprise one or more components, for example, as illustrated in FIG. 3.

Figure 2:
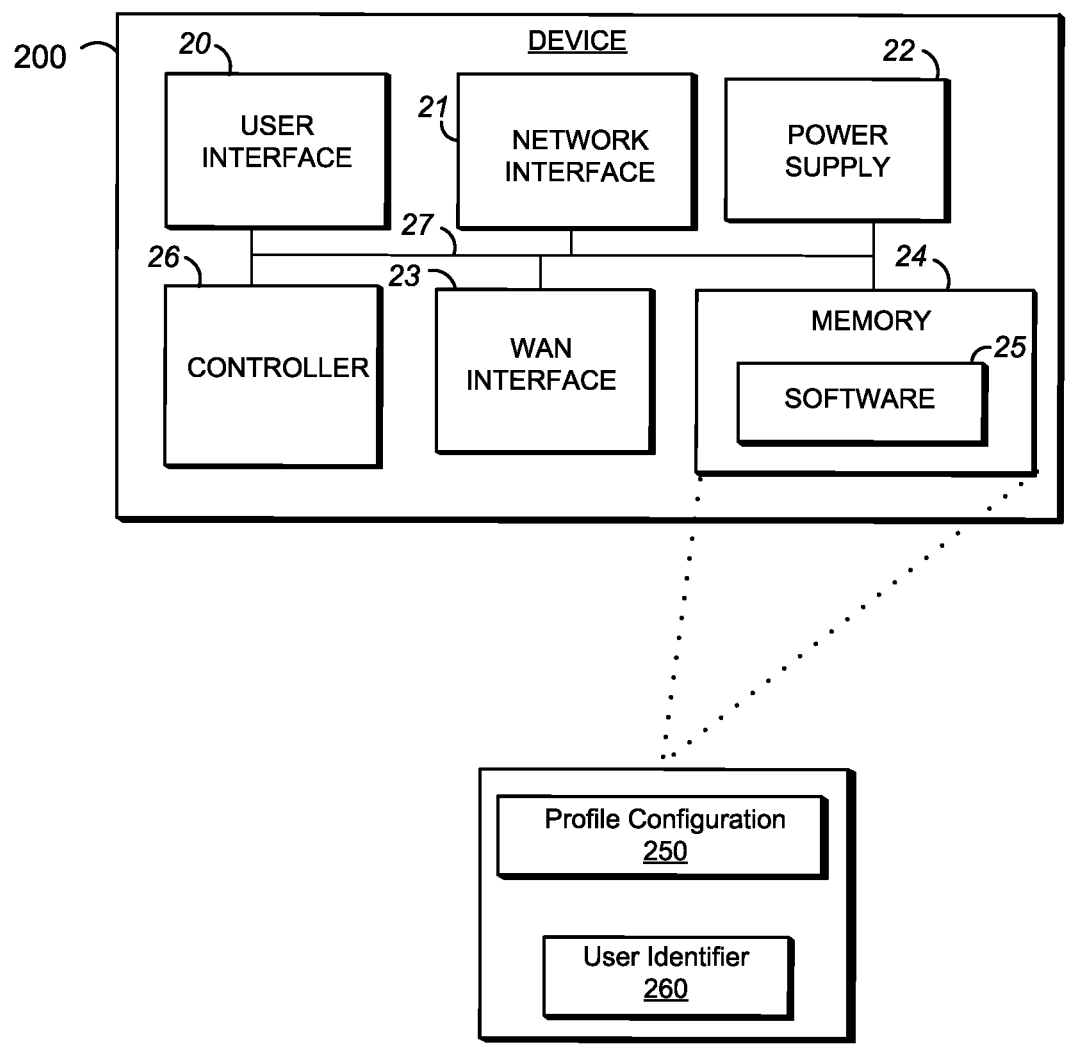
FIG. 2 is a more detailed block diagram illustrating various components of a device, according to one or more aspects of the present disclosure.
Figure 3:
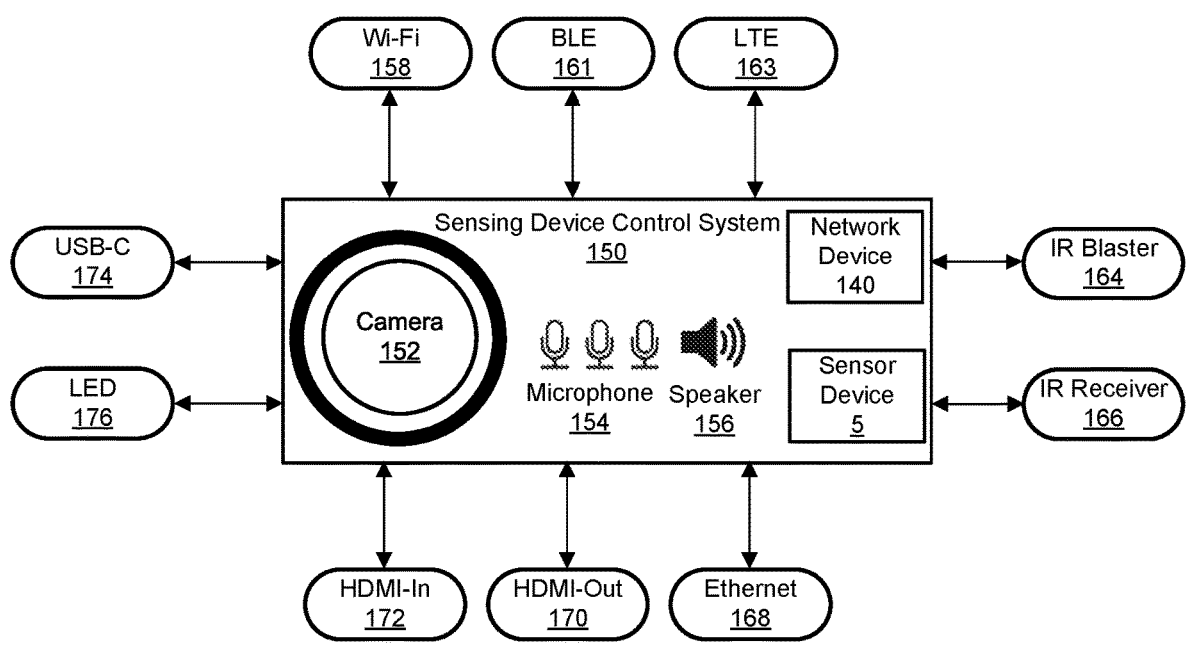
FIG. 3 is an exemplary sensing device control system, according to one or more aspects of the present disclosure.
Figure 4:
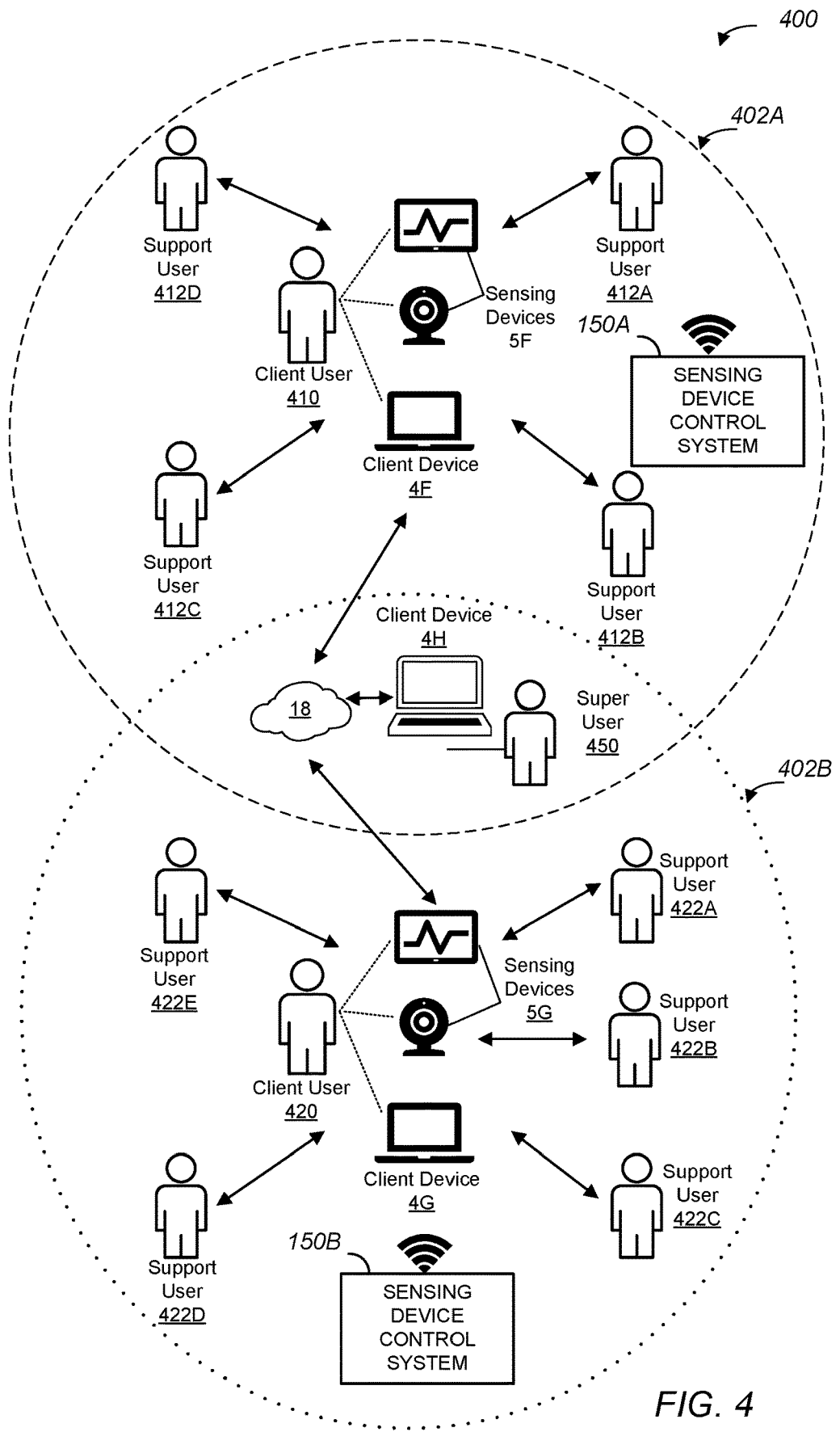
FIG. 4 is an illustration of a network environment for multiple multi-modal portal system networks, according to one or more aspects of the present disclosure.

FIG. 3 illustrates a sensing device control system 150, according to one or more aspects of the present disclosure. The sensing device control system 150 can comprise any of an optical instrument or image capture device (such as a camera 152 or any other device that can obtain one or more visuals of a client user), an audio input device (such as one or more microphones 154, a microphone array, a far field voice (FFV) solution, etc.), an audio output device (such as a speaker 156), a sensing device 5, a network device 140, or any combination thereof. In one or more embodiments, any one or more components of the sensing device control system 150 can be included within or connected to the sensing device control system 150. The sensing device control system 150 can comprise any of one or more ports or receivers, for example, a Wi-Fi (such as a Wi-Fi5 (dual-band simultaneous (DBS))) port 158, a BLE port 161, an LTE port 163, an infrared (IR) blaster port 164, and IR receiver port (166), an Ethernet port 168, an HDMI-Out port 170, an HDMI-In port 172, an external power supply (such as a universal serial bus type-C (USB-C), an LED output 176, or any combination thereof. The sensing device 5 can comprise any one or more types of sensors such as any of a power sensor, a temperature sensor, a light sensor, a humidity sensor, a motion sensor, a biometric sensor (such as a blood pressure monitor, oxygen saturation meter, pulse meter, etc.), any other type of sensor, or any combination thereof. In one or more embodiments, the sensing device 5 can be an IoT device. The network device 140 can receive any of a video notification, an image (for example of a client user) via camera 152, any data associated with one or more sensor devices 5, microphone 154, speaker 156, any other element, or combination thereof. The video notification can include data for display on a display device associated with the sensing device control system 150, for example, any of a television, a monitor, a network device 150 with display functionality connected to and/or part of the sensing device control system 150, a user interface (such as user interface 20 discussed with reference to FIG. 2), or any combination thereof.

Turning back to FIG. 1, the sensing device control system 150 can be connected to one or more sensing devices 5 (for example, any of sensing devices 5A-5I), one or more network devices 140 (for example, any of multi-sensor devices 140A-D), and any combination thereof. For example, for remote well-being monitoring, the one or more network devices 140 can collect data from a variety of sources, such as one or more sensing devices 5, with different capabilities. In additional to functional differences, the one or more sensing devices 5 can have differences in the protocol or method of communication to one or more network devices 140. The one or more network devices 140 can be data aggregators that collect data from the one or more sensing devices 5 and send the collected data to the sensing device control system 150. To provide coverage for the various sensing devices 5 distributed at or about a premises (such as a network 102), a plurality of network devices 140 can be distributed within range of the one or more sensing devices 5 so as to provide resiliency or redundancy in the data aggregation of data collected or received from the one or more sensing devices 5. In one or more embodiments, the network device 140 can have limited connectivity functionality, such as short range wireless protocol functionality. For example, the network device 140 may not require Wi-Fi connectivity but rather can communicate with the sensing device control system 150 using any one or more short range wireless protocols. A network device 140 can include any of a BLE radio, a ZigBee radio, a LoRa radio, any other short range connectivity technology, or any combination thereof for communication to any of one or more sensing devices 5, one or more network devices 140, the sensing device control system hub 150, or any combination thereof. The network device 140 can also include any of a sensor (such as a sensing device 5), an external power source, associated connectivity software, such as BLE mesh networking software, or any combination thereof. For example, the sensing device control system 150 can connect to one or more network devices 140 via a connection 141 that comprises a Bluetooth mesh connection. The multi-sensor hub 150 and/or the one or more network devices 140 can connect to one or more sensing devices 5 via a primary connection 151, a secondary connection 149 or both so as to establish a resilient hybrid topology network. In one or more embodiments, the one or more network devices 140 and the sensing device control system 150 along with associated connections constitute a mesh topology, for example, any of a whole-site BLE sensor network, any other network topology, or any combination thereof.

As an example, a sensing device control system 150 can connect to a sensing device 5A via a secondary connection 149, a network device 140A via a connection 141, a network device 140C via a connection 141, a network device 140D via a connection 141, a sensing device 5H via a secondary connection 149, and a sensing device 5I via a secondary connection 149. The network device 140A can also connect to the sensing device 5A via a primary connection 151, a sensing device 5B via a secondary connection 149, a network device 140B via a connection 141 and a network device 140C via a connection 141. The network device 140B can also connect to the sensing device 5B via a primary connection 151, a sensing device 5D via a primary connection 151, a sensing device 5C via a primary connection 151, and a sensing device 5E via a secondary connection 149. The network device 140C can also connect to the sensing device 5E via a primary connection 151, a sensing device 5F via a primary connection 151, a sensing device 5G via a secondary connection 149, and the network device 140D via a connection 141. The network device 140D can also connect to the sensing device 5G via a primary connection 151, the sensing device 5H via a primary connection 151, and the sensing device 5I via the primary connection 151. In one or more embodiments, the primary connection 151, the secondary connection 149, or both can be any type of short range connection.

A network device 140 can be distributed throughout a network 102, for example, comprising any of a home, a care provider, an assisted living facility, any other environment that requires receiving or aggregating data from various sensing device 5 and/or network devices 140, or any combination thereof. In one or more embodiments, the primary connection 151 provides a sensor data path for data associated with a sensing device 5. In one or more embodiments, the secondary connection 149 provides a redundant or back-up sensor data path for data associated with the sensing device 5. For example, if a network device 140 experiences a failure, becomes overloaded, or otherwise does not function or operate properly or as expected the sensing device 5 can be instructed to switch to the secondary connection 149 to a primary connection 151 and to establish a new secondary connection 149 with a different network device 140 or to only maintain the new primary connection 151. For example, a sensing device 5B can be instructed to disconnect the primary connection 151 to the network device 140B and/or switch to the secondary connection 149 to the multi-sensor device 140A as a new primary connection 151. For example, the sensing device control system 150 can determine that the path associated with the network device 140B experiences more latency due to the multiple connection points than the path associated with the network device 140A which has a direct connection 141 to the sensing device control system 150 such that the secondary and primary paths should be switched.

In one or more embodiments the network 102 can comprise a Bluetooth mesh topology that allows for resilience in terms of transmission of data collected or aggregated from the one or more sensing device 5 and/or the one or more network devices 140 and sent to the access point device 2 via the sensing device control system 150. In one or more embodiments, the topology of network 102 is not a full mesh topology where every network device 140 or data aggregator is able to communicate with every other network device 140 or data aggregator but still provides the availability of multiple data paths to the access point device 2 so as to provide resiliency.

FIG. 2 is a more detailed block diagram illustrating various components of an exemplary device 200, according to one or more aspects of the present disclosure. A device 200 can comprise any of a network device 140, a portal system 180, a management system 160, an access point device 2, a network device 140, a sensing device 5, any other device, or any combination thereof implemented in the network 102 of FIG. 1, according to one or more aspects of the present disclosure. The device 200 can be, for example, a computer, a server, any other computer device with smart capabilities capable of connecting to the Internet, cellular networks, and interconnecting with other network devices via Wi-Fi and Bluetooth, or other wireless hand-held consumer electronic device capable of providing management and control of user data, for example, a portal system 180, according to one or more aspects of the present disclosure. The device 200 includes one or more internal components, such as a user interface 20, a network interface 21, a power supply 22, a controller 26, a WAN interface 23, a memory 34, and a bus 27 interconnecting the one or more elements.

The power supply 22 supplies power to the one or more internal components of the device 200 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 20 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the device 200, for example, for a user to enter any one or more profile configurations 250, a user identifier 260, any other information associated with a user or network device, or a combination thereof that are stored in memory 34. The network interface 20 can include, but is not limited to, various network cards, interfaces, and circuitry implemented in software and/or hardware to enable communications with and/or between any one or more of the portal system 180, the access point device 2, a network device 140 using any one or more of the communication protocols in accordance with any one or more connections (for example, as described with reference to FIG. 1). In one or more embodiments, the user interface 20 enables communications with a sensing device 5, directly or indirectly.

The memory 24 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical storage system, a hard disk or any other various layers of memory hierarchy. The memory 24 can be used to store any type of instructions, software, or algorithms including software 25, for example, an application (such as any of a software, a module, a process, any other one or more computer-readable instructions, or any combination thereof), for controlling the general function and operations of the device 200 in accordance with one or more embodiments. In one or more embodiments, memory 24 can store any one or more profile configurations 250 associated with one or more user identifiers 260 so as to provide (for example, by an application of a portal system 180) aggregation, monitoring, and control of user data, such as user data received from one or more sensing devices 5, one or more network devices 140, or both. For example, controlling or establishing a visual interface connection between two network devices, such as between a network device 140D and a network device 140C or between a network device associated with a client user and a network device associated with a trusted user (also referred to as a trusted user device). The one or more user identifiers 260 can comprise a unique identifier associated with one or more users, one or more network devices, or both. The one or more user identifiers 260 can be associated with one or more profile configurations 250 which include information associated with one or more profiles of one or more users. An application, such as software 25, can manage and control access to user data associated with the one or more user identifiers 260 based on the one or more profile configurations 250 and/or can provision one or more sensing device 5. In one or more embodiments, the profile configuration 250 and/or the user identifier 260 is stored in any type of storage medium local to or remote from the device 200.

The controller 26 controls the general operations of the device 200 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 25. Communication between the components (for example, 20-26) of the device 200 may be established using an internal bus 27.

The network interface 21 can include various network cards, interfaces, and circuitry implemented in software and/or hardware to enable communications with any one or more other devices, for example, any of a sensing device 5, a network device 140, a sensing device control system 150, a network resources, such as a management system 160 and/or a portal system 180, an ISP 1, any other device (for example, as described with reference to FIG. 1), or a combination thereof. The communications can utilize a visual interface connection that allows for a visual interface between two users, for example, a communication that utilizes an optical instrument (such as for a video call or for an image capture). For example, the network interface 21 can include multiple radios or sets of radios (for example, a 2.4 GHz radio, one or more 5 GHz radios, and/or a 6 GHz radio), which may also be referred to as wireless local area network (WLAN) interfaces. In one or more embodiments, one radio or set of radios (for example, 5 GHz and/or 6 GHz radio(s)) provides a backhaul connection between the wireless extender access point device 3 and the access point device 2, and optionally other wireless extender access point device(s) 3. In one or more embodiments, the portal system 180 is connected to or is part of the access point device 2 such that a backhaul connection is established between the portal system 180 and one or more wireless extender access point devices. Another radio or set of radios (for example, 2.4 GHz, 5 GHz, and/or 6 GHz radio(s)) provides a fronthaul connection between the extender access point device and one or more network device(s) 140.

The wide area network (WAN) interface 23 may include various network cards, and circuitry implemented in software and/or hardware to enable communications between the access point device 2 and the ISP 1 using the wired and/or wireless protocols in accordance with connection 13 (for example, as described with reference to FIG. 1).

Figure 5:
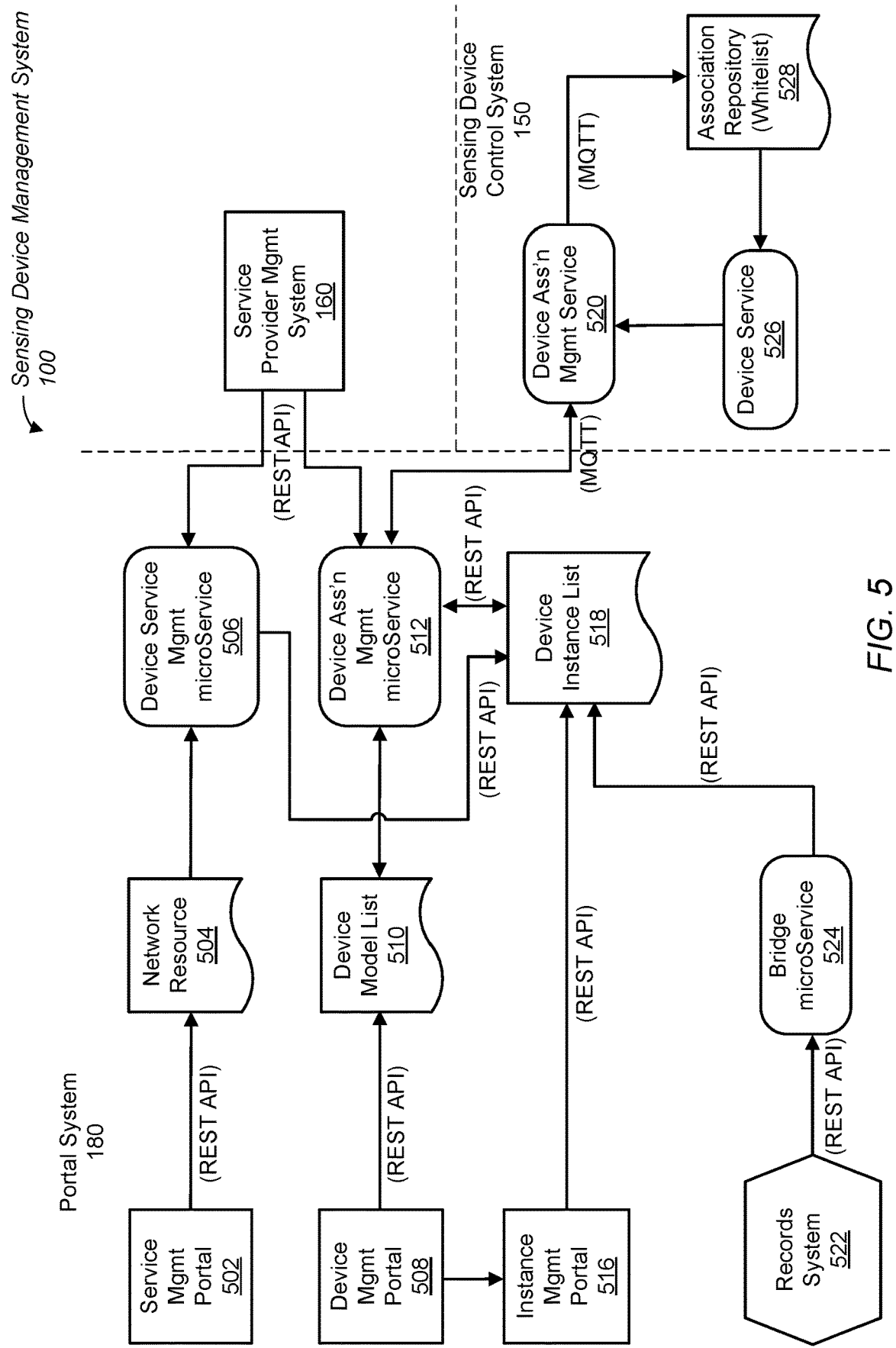
FIG. 5 is a flow diagram for provisioning one or more devices for a sensing device management system, according to one or more aspects of the present disclosure.

FIG. 5 is a flow diagram for provisioning one or more devices for a sensing device management system, according to one or more aspects of the present disclosure. A portal system 180 can comprise a software, such as a portal application that comprises a service management portal 502, a network resource 504, a device service management microservice 506, a device management portal 508, a device model list 510, an instance management portal 516, a device-pair management microservice 512, a device instance list 518, a records system 522, a bridge microservice 524, any other module or component for managing data, or any combination thereof. A sensing device control system 150 can comprise a software, such as a control application that comprises a device pairing management service 520, a pairing repository 528, a device service management microservice 526, any other component for managing data, or any combination thereof.

The service management portal 502 provides an interface to a management system 160. In one or more embodiments, the portal system 180 includes the management system 160. The service management portal 502 provides information associated with one or more supported entitlements associated with a user and/or a device (such as any of one or more services (for example, any of a secure person identifier service (for example, that uses facial and/or voice recognition), an advanced radar based multi-person detection service, a text-to-speech-to-text service, an interview questionnaire service, any other suitable service, or any combination thereof), one or more tiers (such as any of a base tier (for example, a basic services bundle or essential bundle), an advanced voice tier (for example, a text to speech (TTS) service and/or speech to text (STT) service), an advanced activity tracker tier, a premium bundle (for example, that combines multiple services), any other suitable service, or any combination thereof), one or more catalogs (for example, a database that comprises a list of one or more services, offers, tiers and/or bundles), any other resource that identifies a supported device, function, etc., or any combination thereof) to the network resource 504, for example, via an application programming interface (API) or web interface, such as a representational state transfer protocol (RESTful) API (REST API). For example, a user administrator (such as one or more authorized users), another application, or both, can configure any one or more associations between any of a network 102, a device (such as any of an access point 2, a management system 160, a network device 140, a sensing device 5, or any combination thereof), a user identifier 260, any other component and/or element, or any combination thereof and one or more supported entitlements via the service management portal 502. The one or more supported entitlements can be used to provide an instance of a device in the device instance list 518. For example, the device service management microservice 506 can receive from the service management portal 502 via the network resource 504 the one or more supported entitlements and provide the one or more supported entitlements to the device instance list 518 such that an instance of a device is only created or provided if the user and/or the device is associated with a supported entitlement. As an example, a sensing device 5 can comprise a blood pressure monitor associated with a user. The blood pressure monitor can be a device provided in the device model list 510. However, a user associated with the blood pressure monitor may not have as a supported entitlement access to an instance of the blood pressure monitor and thus an instance of the blood pressure monitor associated with the user is not created in the devices instance list 518 and as such the sensing device control system associated with the user does not allow or permit connection to the blood pressure monitor.

In one or more embodiments, the portal system 180 can provide one or more functionalities such as any of a user provisioning that allows one or more users access to the portal system 180 based, for example, on one or more roles associated with the one or more users, device management (for example, any of onboarding of one or more devices, provisioning of one or more individual devices, entitlement of one or more devices with one or more services, association of one or more devices with one or more accessories, management of download of software, any other management service, or any combination thereof), one or more internal user management functions (for example, any of add one or more new services, manage one or more new services, add one or more new customers, associate one or more devices with one or more customers, any other internal management function, or any combination thereof), device telemetry (for example, collection of data, data analysis, or both), diagnostics and/or troubleshooting, any other functionality or any combination thereof.

The network resource 504 can comprise a repository, such as any of a memory, a flat-file system, a database, any other storage system, or any combination thereof for storing and/or providing information associated with one or more supported entitlements. The information can further be associated with any of a user identifier 260, a particular network 102, a particular device, an account (such as a service associated with any of a user identifier 260, a particular network 102, a particular device, or any combination thereof), any other identifier, or any combination thereof. The network resource 504 can store the data in a repository local to or remote from the portal system 180. The network resource 504 can provide the data, data that identifies a particular device that is supported, to a device service management microservice 506.

The device service management microservice 506 can comprise a service that receives information from a network resource 504, a management system 160 via, for example, a web interface, such as a REST API, or both. The device service management microservice 506 associates or provides entitlements (for example, verifies access to one or more services, such as that payment or other authorization has been received) for one or more users (for example, proxied by the sensing device control system 150 which can be the main hub and can be associated with a single user, for example). For example, the device service management microservice 506 can ensures that devices are not improperly used, such as ensuring that a healthcare service is not installed to run on a DOCSIS modem.

The device management portal 508 provides a user interface for managing and/or configuring one or more devices, such as any of a sensing device control system 150, a network device 140, a sensing device 5, any other device in a network 102, or any combination thereof. The device management portal 508 provides one or more provisioning requirements to a device model list 510 via a web interface, for example, a REST API, an instance management portal 516, or both. The one or more provisioning requirements can comprise any of one or more protocols, one or more interfaces, a hardware version, a software version, a model, a security feature, a relationship, a description, an identifier (such as any of a name, a serial number (S/N), a manufacturer identification number, a unique identifier, a quick response (QR) code, any other type of identifier, or any combination thereof) an allowed accessory table, a relationship to any of a user identifier 260, a network 102, any other device, or any combination thereof, an accessory type, a pre-provisioning requirement, a maximum number of supported devices, a connection protocol (such as Wi-Fi, Bluetooth, BLE, etc.), any other device data, or any combination thereof. For example, the device management portal 508 allows a system administrator (such as one or more other authorized users) to create a device model that indicates the one or more devices associated with a user identifier 260 that are permitted (authorized or validated) to associate with the sensing device control system 150.

As an example, an environment (for example, a home, an assisted living facility, a senior care and/or living facility, a multi-dwelling unit, etc.) can comprise a plurality of units, such as a plurality of living spaces. Each unit can be associated with a plurality of devices, for example, any of a sensing device control system 150, one or more sensing devices 5, any other device, or any combination thereof. In the absence of a relationship of specific instances of each device, there will be association promiscuity. For example, an environment can comprise a unit 402A associated with a client user 410 that comprises a first sensing device control system 150A that is capable of using a wireless protocol to communicate with one or more wireless (such as BLE) equipped sensing devices 5F and a unit 402B associated with a client user 420 that comprises a second sensing device control system 150B that is capable of using a wireless protocol to communicate with one or more wireless equipped (such as BLE) sensing devices 5G. A first sensing device 5 of the one or more sensing devices 5F can be the same as or similar to a second sensing device 5 of the one or more sensing devices 5G and the environment can be such that data from either can be received at both the first sensing device control system 150A and the second sensing device control system 150B. However, based on the one or more respective provisioning requirements, the first and second sensing device control systems 150 only allow connections from one or more respective sensing devices 5 that have a defined relationship, for example, first sensing device 5F has a defined relationship with first sensing device control system 150A such that first sensing device 5F can connect to the first sensing device control system 150A and second sensing device 5G has a defined relationship with second sensing device control system 150B such that second sensing device 5G can connect to the second sensing device control system 150B. In this way, only data from the one or more sensing devices 5 that have a relationship with the respective sensing device control system 150 is collected, stored, or otherwise analyzed by the respective sensing device control system 150. For example, the sensing device control system 150B will ignore or otherwise deny a pairing request by a sensing device 5F as the sensing device 5F does not have a defined relationship with the sensing device control system 150B.

In one or more embodiments, one or more devices, such as one or more sensing devices 5, can be added as being supported by the sensing device management system 100. Information, such as any of a type, a make, a model, any other information or data, or any combination thereof, can be added to the device model list 510. This information regarding a new device can be entered by a user via the device management portal 508. For each instance of such device, the instance management portal 516, the bridge microservice 524, or both creates or otherwise instantiates an entry in the device instance list 518. For example, a new device can be added to the device model list 510 and a corresponding instance of the device added to the device instance list 518 that is associated with each user that has received or has been identified as needing support for the new device. For example, if 1,000 users are provided the new device for use and/or identified as associated with the new device, then 1,000 instances of the new device will be added to the device instance list 518.

The device model list 510 comprises a repository, such as any of a memory, a flat-file system, a database, any other storage system, or any combination thereof, for storing one or more provisioning requirements for a supported device including, but not limited to, one or more relationships. A supported device can be a device that meets or otherwise has the functionality to support one or more provisioning requirements. The device model list 510 can be configured via the device management portal 508 with one or more provisioning requirements. For example, each sensing device control system 150 can have any of one or more devices associated with or otherwise paired, such as one or more network devices 140, one or more sensing devices 5, any other device, or any combination thereof. As discussed with reference to FIG. 2, any one or more devices can be included with or as part of the sensing device control system 150. The sensing device control system 150 can connect to, for example, pair with, one or more devices, such as one or more sensing devices 5 that have a defined relationship with the sensing device control system 150.

The device association management microservice 512 can send to and receive from the device model list 510 device information based on one or more provisioning requirements. The device association management microservice 512 manages the association of a device, such as a sensing device, to any of a user identifier 260, a network 102, a sensing device control system 150, a network device 140, a sensing device 5, any other device, or any combination thereof. For example, the device association management microservice 512 can manage the pairing of a validated device, for example, a device that is known to operate or otherwise function with the sensing device control system 150, a user and/or a location associated with the sensing device control system 150, or any combination thereof, to one or more other devices associated with a user identifier 260. For example, a management system 160 can associate one or more specific instances of a device using REST API so as to create a secure and verifiable one to one relationship for each instance of the device. For example, a particular sensing device 5 can be a validated device as provided by the device association management microservice 512, such as a relationship is defined based on one or more provisioning requirements, for example, for the sensing device 5 and the sensing device control system 150 so as to permit association/pairing of the sensing device 5 with the sensing device control system 150. The management system 160 can send a request to associate an instance of the device to the device instance list 518 via the device association management microservice 512. The device association management service 512 can then provide upon request or push the instance of the device to the device association management service 520 for storing in a whitelist, for example, an association repository 528. In one or more embodiments the management system 160 can send a request that comprises a bulk update of one or more instances associated with one or more devices.

In one or more embodiments, device association management microservice 512 stores an intent of a care provider to associate (define a relationship for) one or more accessories to a corresponding one or more devices, such as one or more sensing devices 5. These defined relationships can be managed, including the associated accessories, using the device association microservice 512. As an example, the device association management microservice allows a care provider to associate (or define a relationship) a first sensing device to a first sensing device control system 150 and a second sensing device to a second sensing device control system 150.

The instance management portal 516 utilizes one or more provisioning requirements received from the device management portal 508 to provide management of a device instance. A device instance can be created based on the one or more provisioning requirements from the device management portal 508. When a user associated with a user identifier 260 logs into the portal system 180 via an ISP 1, the user can be provided with the one or more devices that can be associated with the user identifier 260 or otherwise used to receive data from for an associated user identifier 260. For example, the instance management portal 516 can provide a user interface that provides the one or more devices shipped or otherwise provided to a user (if any) and the one or more devices eligible (authorized or otherwise validated) to be associated with a user identifier 260.

Each sensing device control system 150 is identified at the instance management portal 516, for example, by using a unique identifier such as a serial number, a MAC address, and/or any other unique identifier. An explicit list is maintained by the instance management portal 516 for all the instances of each device, such as each sensing device 5, that is sent to one or more users, for example using a unique identifier associated with the device, such as a serial number, a make, a model, etc. The instance management portal 516 provides an interface for creating, reading and/or accessing, updating, deleting, and/or otherwise managing the one or more instances of devices.

The device instance list 518 comprises a repository, such as any of a memory, a flat-file system, a database, any other storage system, or any combination thereof, for storing device instance information, for example, as received via a web interface, such as a REST API, from the instance management portal 516. For example, information associated with an instance of a device can be stored at, read and/or accessed from, or both by the instance management portal 516 from the devices instance list 518. The information associated with an instance of the device can comprise any of a device make, a device model, a device type, a serial number, a MAC address, any additional device specific information, such as hardware revision/version, software revision/version, etc., associated accessories, any other device specific information, or any combination thereof. The information can be derived from a records system 522.

The records system 522 stores or otherwise provides access to one or more device records associated with one or more devices, such as an access point 2, a management system 160, a network device 140, a sensing device 5, or any combination thereof. The records system 522 can be located external to, remote from or otherwise outside of the portal system 180. For example, the records system 522 can be a server hosted by a manufacturer and/or any other entity. The one or more device records can comprise any of a device make, a device model, a device type, a serial number, a MAC address, any additional device specific information, such as hardware revision/version, software revision/version, etc., associated accessories, any other device specific information, or any combination thereof. The records system 522 can comprise one or more repositories, for example, an internal repository that comprises on information associated with devices provided by an entity that controls the management system 160, an external repository that comprises information provided by one or more third parties, or both.

The bridge microservice 524 can comprise a service that interfaces with the records system 522 via a web interface, such as REST API, so as to provide information, such as one or more manufacturer records, associated with one or more devices to the device instance list 518 via a web interface, for example, a REST API. For example, the bridge microservice 524 can access a records system 522 that comprises a third-party website or interface, an internal website or interface, or both.

The sensing device control system 150 can comprise one or more elements, such as any of a device association management service 520, an association repository 528, a device service management microservice 526, or any combination thereof. A device association management service 520 can communicate with a device association management microservice 512 via one or more network protocols, for example, a messaging service, such as an IoT messaging protocol, including, but not limited to, message queuing telemetry transport (MQTT) protocol. For example, the device association management service 520 sends a service query for information from the device association management microservice 512. The service query can comprise an identifier associated with the sensing device control system 150 and a request for one or more accessories, one or more devices, or both associated with (or that have a relationship with) the sensing device control system 150. The device association management microservice 512 can send a response to the device association management service 520 that comprises a policy and/or an updated policy, for example, that comprises one or more accessories and/or devices that the sensing device control system 150 is permitted to connect to, pair or otherwise associate with based on a defined relationship identified by the device association management microservice 512, for use by the device association management service 520 to update or otherwise alter a whitelist of the association repository 528. In this way, the device association management service 520 can reduce or eliminate repeated queries to the device association management microservice 512 as the information needed to make connections can be retained locally at the association repository 528, for example, that comprises one or more pairing rules, that receives the information from the device association management service 520. The device association management service 520 can then use the information in the response to enforce the defined relationship so as to permit, limit, and/or exclude connections of one or more devices to the sensing device control system 150.

An association repository 528 can receive from the device association management service 520 association information associated with one or more devices associated with any of a user identifier 260, a network device 140, a sensing device 5, a sensing device control system 150, or any combination thereof via a messaging service, such as an IoT messaging protocol, including, but not limited to, MQTT protocol. The association repository 528 can maintain or otherwise store one or more devices in a whitelist such that data received from a device in the whitelist is authorized or otherwise validated to provide data associated with a user identifier 260. For example, when a sensing device pairs with the sensing device control system 150, the sensing device control system 150 verifies that the association repository 528 comprises one or more association rules for the sensing device 5, such as by comparing a unique identifier associated with the sensing device 5 to one or more entries in the association repository 528.

A device service 526 receives from the association repository 528 a whitelist or one or more validation parameters that are associated with one or more validated devices, such as one or more devices that have been validated for receiving data associated with user identifier 260. The one or more validation parameters can comprise a unique identifier associated with a sensing device 5.

Figure 6:
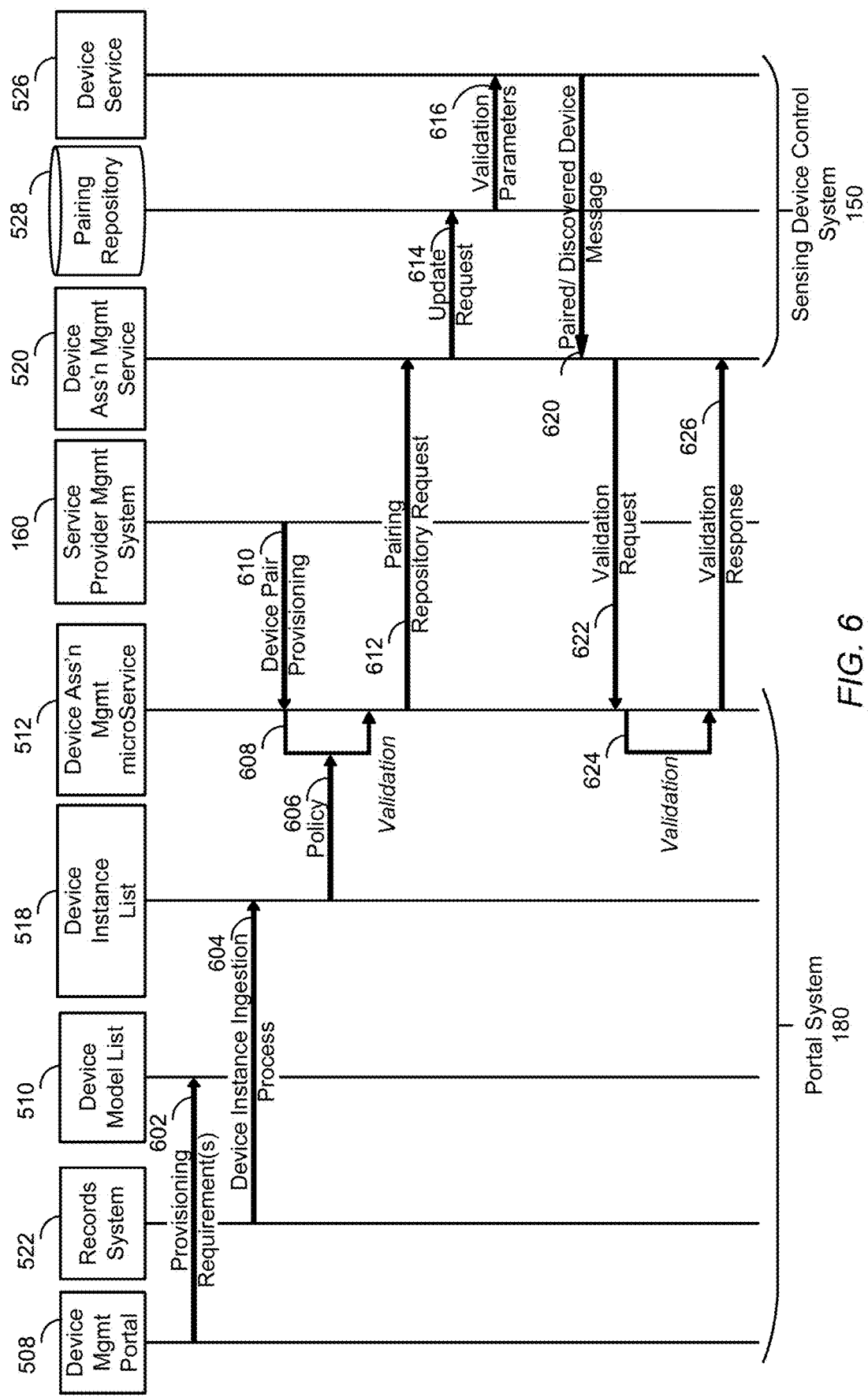
FIG. 6 is a flow diagram for pairing (associating) a device, according to one or more aspects of the present disclosure.

FIG. 6 is a flow diagram for pairing (associating) a device, according to one or more aspects of the present disclosure. A device management portal 508 sends one or more provisioning requirements 602 to a device model list 510.

The records system 522 initiates a device instance ingestion process 604. For example, information associated with the device is collected from an internal source, a user, an external source (such as a third-party website or database), etc. As an example, a user can manually enter information associated with the device. In one or more embodiments, the user is associated with one or more authorizations or one or more permissions that permit access to the records system 522. The device instance ingestion process 604 comprises sending one or more device records to the device instance list 518.

The association management microservice 512 can receive a device pair provisioning request 610 from the management system 160. The device pair provisioning request 610 can comprise a device identifier (for example, an identifier that uniquely identifies the device to be associated, such as such as the device to be paired). The device association management microservice 512 can perform a validation 608 of the device associated with the device pair provisioning request 610. The validation 608 can comprise receiving a policy 606 associated with an instance of the device from the device instance list 518. For example, the association management microservice 512 can send a query to the device instance list 518 and in response, the device instance list 518 can send a policy 606 associated with an instance of the device of the device pair provisioning request 610. The policy 606 can indicate one or more accessories that are associated with or that can be used with an instance of a device. The policy 606, for example, can be used to prevent unallowed connections, for example, prevent an accessory from being associated with a device that does not support the accessory.

As an example, a user, such as a customer or subscriber to a service (for example, a health monitoring service), is provided a device with information associated with the user and the device stored or otherwise collected by the management system 160. For example, any of the serial number, MAC address, type, make, model, any other identifier, or any combination thereof can be collected and/or stored. The user can then be sent or otherwise provided the device.

If the device association management microservice 512 validates the device of the device pair provisioning 610, then the device association management microservice 512 sends a pairing repository request 612 to the device association management service 520 to have the validated device added to a whitelist. The device association management service 520 can send an update request 614 to the association repository 528. The update request 614 can comprise one or more instructions that cause the association repository 528 to update, amend, and/or otherwise add the validated device to a whitelist.

The association repository 528 can send to the device service 4-26 one or more validation parameters 616. The one or more validation parameters 616 can be indicative of a whitelist, for example, information associated with one or more devices that have been validated. The device service 526 can determine whether a connection should be permitted, for example, whether to proceed or to not proceed with a connection to an accessory and/or a device based on the whitelist received from the association repository 528. For example, the device service 526 enforces the relationship associated with the device.

When the device service 526 discovers or attempts to pair a device, the device service 526 can compare information associated with the device to the one or more validation parameters 616 received from the association repository 528. Based on the comparison, the device service 526 can send to the 565 can send a paired/discovered device message 620 to the device association management service 520. In one or more embodiments, the device association management service 520 can update the association repository 528 with a status or a current association of the device, for example, that the device is currently paired to one or more accessories.

The device association management service 520 can send a validation request 622 to the device association management microservice 512. The validation request 622 can comprise information associated with the device to be validated. The device association management microservice 512 can perform a validation 624. Based on the validation 624, the device association management microservice 512 can send a validation response 626 to the device association management service. For example, providing a local association repository 528, such as a whitelist, allows for a validation request to be processed locally without requiring communication with a network resource, a cloud resource, or any other system that is remote from the sensing device control system 150 which improves latency. To ensure that any changes, updates, alterations, or any other modifications to one or more association rules are utilized when processing the validation request, a sensing device control system 150 can query the device association management microservice 512 for each validation requestion, at timed intervals, randomly, or at any other time or event. For example, the sensing device control system 150 can periodically send a query to the device association management microservice 512 and update the association repository 528 if necessary based on the response from the device association management microservice 512.

Figure 7:
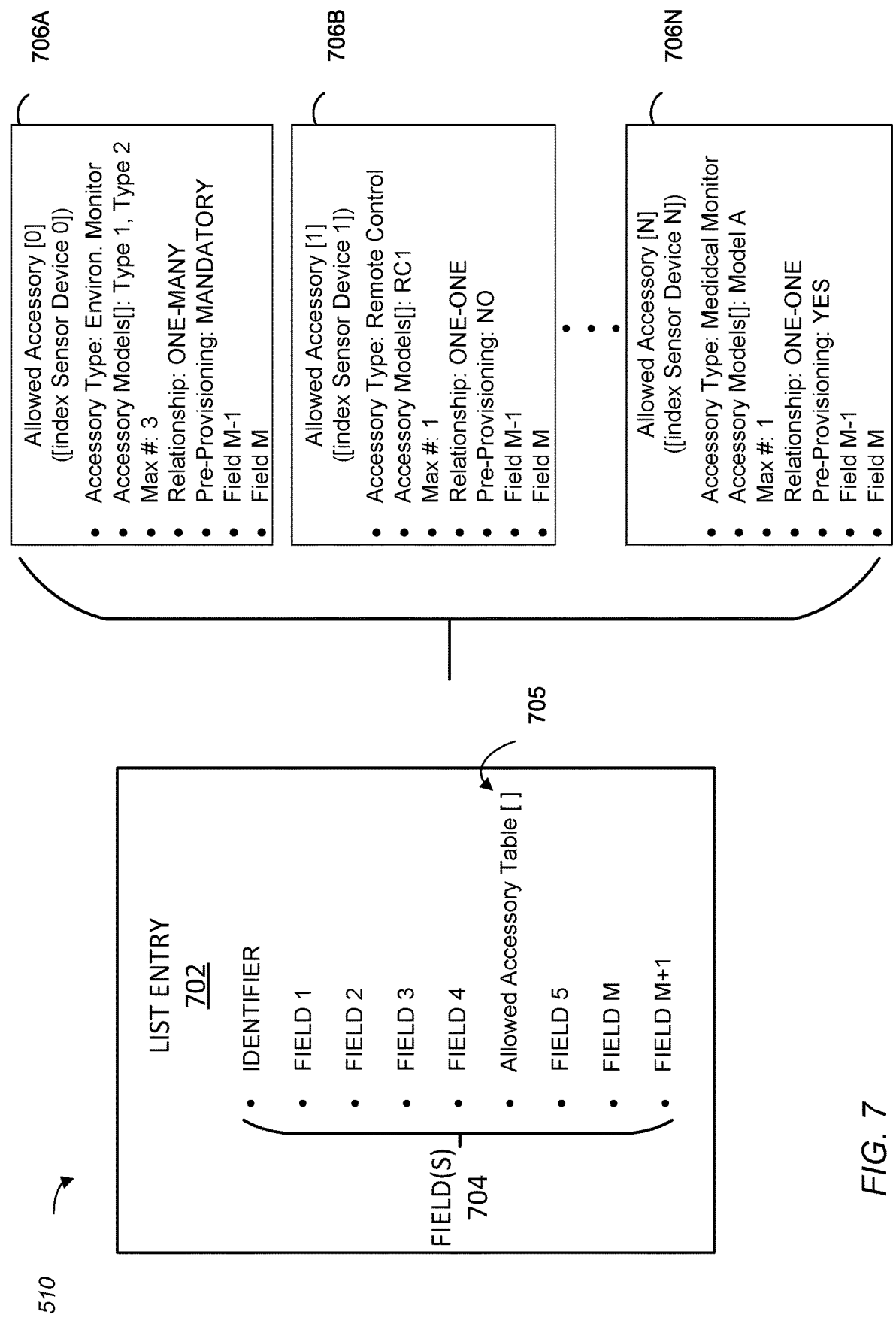
FIG. 7 illustrates one or more provisioning requirements associated with a sensing device control system of a device model list, according to one or more aspects of the present disclosure.

FIG. 7 illustrates one or more provisioning requirements 602 associated with a sensing device control system 150 of a device model list 510, according to one or more aspects of the present disclosure. The one or more provisioning requirements 602 can be associated with a device, for example, a sensing device control system 150 based on an identifier, any other information associated with the device, or any combination thereof. The device model list 510 can comprise one or more list entries 702. The one or more list entries 702 can comprise one or more fields P704, such as any of one or more provisioning requirements. A list entry 702 can comprise an allowed accessory table 705 that comprises one or more allowed accessory entries 706, for example, allowed accessory entries 706A, 706B, and 706N, where N represents any number. The one or more allowed accessory entries 706 indicate one or more accessories that are supported by a particular device associated with the list entry 702. The one or more allowed access entries 706 can comprise information associated with a supported device, for example, any of an accessory type (such as an accessory name), an accessory model (such as one or more model types supported), a maximum number of the accessory type (for example, the maximum number of the accessory type that can be connected or otherwise coupled to the associated device of the list entry 702 (such as a sensing device control system 150), a relationship (for example, one to many, one to one, etc.), a pre-provisioning setting (such as whether pre-provisioning is mandatory or not), any other information or field, a protocol, or any combination thereof. The one or more accessories can comprise any of one or more devices such as discussed in this disclosure. For example, a sensing device control system 150 can be associated with a list entry 702 with the allowed accessory table 705 indicating support for the devices indicated by the allowed accessory entries 706A to 706N, such as an environmental monitor (such as any of a temperature sensor, a barometer, a humidity sensor, etc., or any combination thereof), a remote control, and a medical or biometric monitor (such as any of a glucose monitor, a thermometer, a blood pressure monitor, a pulse oximeter, pulsometer, etc., or any combination thereof), respectively. In one or more embodiments, pre-provisioning comprises establishing one or more relationships, for example, a specific instance of a device, one or more accessories associated with a device, or both.

Figure 8:
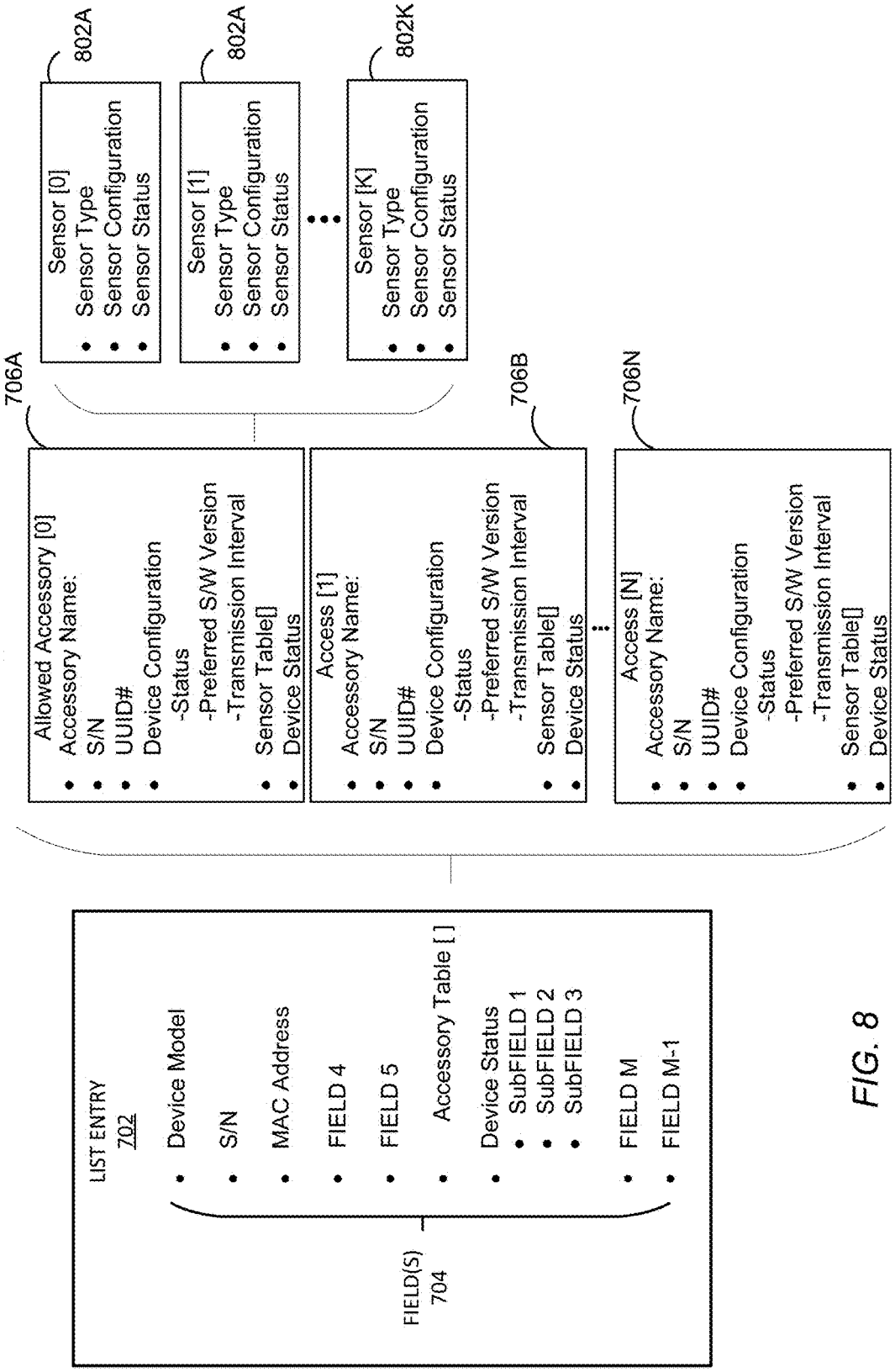
FIG. 8 illustrates one or more provisioning requirements associated with a sensing device control system of a device model list, according to one or more aspects of the present disclosure.

FIG. 8 illustrates one or more provisioning requirements 602 associated with a sensing device control system 150 of a device model list 510, according to one or more aspects of the present disclosure. FIG. 8 is similar to or the same as FIG. 7. FIG. 8 illustrates a list entry 702 that comprise one or more fields 704, such as any of a model, a serial number, a media access control (MAC) address, an access table, a device status, any other fields, or any combination thereof. A device status can comprise real-time information about a device. As an example, a device can be associated with a configuration that comprises any of a serial number, a MAC address, one or more accessories, a manufacturing date, any other configuration information, or any combination thereof. When the device is turned on, for example, the device can be associated with any of a device status of "ON", one or more operational parameters (such as CPU usage), any other status parameters, or any combination thereof. In one or more embodiments, the device status can be based on the type of device, such as a device that comprises a camera can be associated with a device status of "SHUTTER OPEN" or "SHUTTER CLOSED".

One or more allowed accessories entries 706 can comprise information such as any of an accessory name (a supported device), a serial number, a universally unique identifier (UUID), a device configuration (the device configuration can comprises one or more attributes, such as any of a status (for example, device enabled or device disabled), a preferred software version (such as, a software version of any of an operating system, a device driver, an application (App), a protocol, any other software, or any combination thereof), a transmission interval, or any combination thereof), a sensor table, a device status (such as connect or not connected), or any combination thereof. The sensor table attribute can be associated with one or more sensor attributes 802, such as 802A, 802B, and 802K, where K represents any number, collectively referred to as sensor attribute(s) 802. The one or more sensor attributes 802 can comprise any of a sensor type (such as, an environmental sensor, a medial or biometric monitor, or both), a sensor configuration (such as one or more operational parameters associated with the sensor type), a sensor status (such as any of connected or disconnected, powered-up or powered-off, operational or non-operational, or any combination thereof), or any combination thereof.

Figure 9:
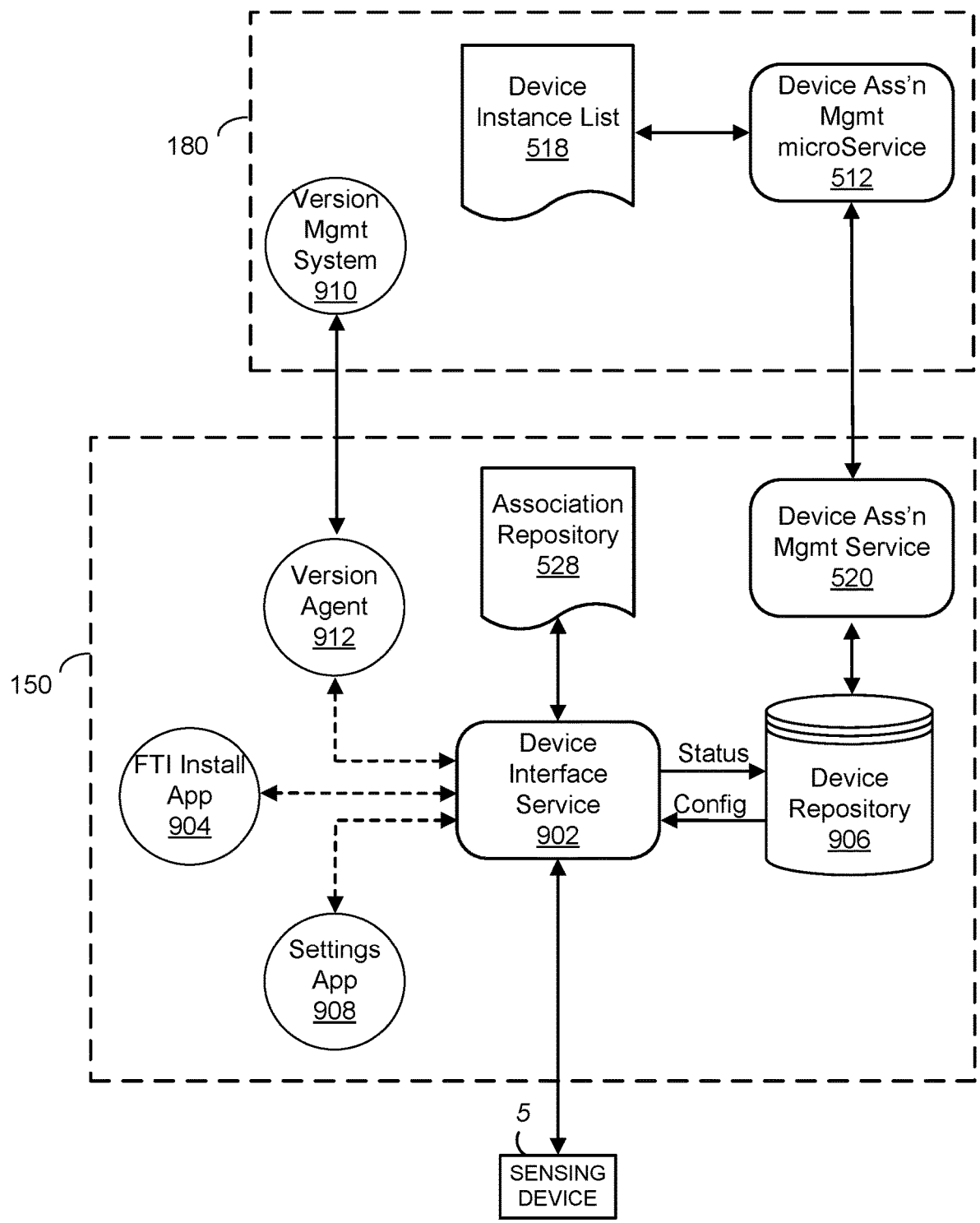
FIG. 9 illustrates a flow diagram for an onboarding of a device, according to one or more aspects of the present disclosure.

FIG. 9 illustrates a flow diagram for an onboarding of a device, such as any of a sensing device control system 150, a network device 140, a sensing device 5, or any combination thereof, according to one or more aspects of the present disclosure. For example, a portal system 180 can onboard a device connected to sensing device control system 150 of a network 102. A first-time installation (FTI) application 904 of the sensing device control system 150 can invoke a device interface service 902 to an active state. A sensing device control system 150 can comprise one or more device interface services 902 associated with one or more types of devices, for example, one or more network devices 140 and/or one or more sensing device 5 that require onboarding or provisioning so as to prevent errant data from or connection of an unknown or improper. The device interface service 902 listens for one or more requests (such as a BLE pairing request) from one or more devices. When a request is received, the device interface service 902 sends a device query to the association repository 528 to receive information associated with the device. For example, the device interface service 902 can determine whether the device is included in a whitelist based on the received information. If the device is included in a whitelist, the device interface service 902 can request device information from a device repository 906. The device repository 906 can comprise, for example, device status of the device. The device repository 906 can send a configuration response associated with the device to the device interface service 902 based on the request, for example, the request can comprise device information. The configuration response can comprise one or more device configuration parameters that the device interface service 902 can use to configure the device and one or more sensors associated with the device, for example, network device 140, a sensing device 5, or both. For example, the one or more device configuration parameters can comprise one or more allowed access entries 706. The device interface service 902 can send a status to the device repository 906, for example, a status that indicates that the device is any of active/inactive, enabled/disabled, connected/disconnected, powered-on/power-off, any other status, or any combination thereof.

In one or more embodiments, a sensing device control system 150 can be provided at a site, for example, a site that can comprise a plurality of different users and devices. The sensing device control system 150 can be connected to or used to establish a network 102. The sensing device control system 150 can be pre-configured with a device repository 906. Once connected to the network and/or an ISP, the sensing device control system 150 can query for and/or receive as a push one or more updates to the device repository 906, for example, from a device instance list 518, a device model list 510, or both. Based on the device repository 906 (that can be local to and/or remote from the sensing device control system 150), the sensing device control system 150 can manage the association and/or pairing of device so as to prevent any malicious or errant device and/or data from being associated with any of a user, a site, a device, a network, or any combination thereof.

In one or more embodiments, the one or more device configuration parameters can be managed, such as any of changed, updated, deleted, added, otherwise altered, or any combination thereof, by a user via a settings application 908, a device management portal 508, or both. For example, a user at the portal system 180, for example, an administrator with proper authorization or credentials, can enter one or more inputs via the device management portal 508 to alter a profile configuration 250 associated with a user 260 so as to add, remove, or otherwise change one or more device configuration parameters associated with a device that is associated with the user 260. The settings application 908 can send and/or the device management portal 508 can receive the one or more inputs to a device model list 510 that can then be access by the device association management microservice 512 to update the paring repository 528, the device repository 906, or both. Similarly, the user 260 or other use with access, credentials, and/or authorization, can enter one or more inputs at a settings application 908 to add, remove, or otherwise change one or more device configurations parameters associated with a device that is associated with the user 260. For example, a new device that provides additional or different sensor data can be added to the network 102 and associated with the user, an upgrade can be required such that a software version associated with a device is changed, a user profile associated with a device, the user 260 or both can be altered (for example, to add and/or remove authorization to a particular individual or entity), etc. The one or more inputs can be sent from the settings app 908 to the device interface service 902 which can send an update request to the device repository 906 so that the device repository 906 can store the updates to the one or more device configuration parameters based on the one or more user inputs. In one or more embodiments, any updates to the device repository 906 are sent to the device association management microservice 512 so that the device instance list 518, the model list 510, or both can be updated.

In one or more embodiments, the portal system 180 comprises a version management system 910 that control or otherwise manages the download of upgrades (such as, software, hardware, or both) to a sensing device control system 150 so as to upgrade a device, such as any of a sensing device control system 150, a network device 140, a sensing device 5, or any combination thereof. For example, the sensing device control system 150 can comprise a version agent 912 that can receive a version notification from the version management system 910 that a firmware, a software or both need to be upgraded, for example, to repair, fix, and/or correct an operation of the device, to add/remove one or more features, to address one or more security issues and/or vulnerabilities, or any combination thereof. The version notification can comprise any of one or more instructions associated with an upgrade, a schedule or alert that indicates a time, deadline, and/or other indicator as to the scheduling of the update, one or more identifiers associated with one or more devices to be upgraded (such as a unique identifier, a group identifier that identifies a group of devices, or both), any other information required to perform the update, or any combination thereof. As an example, an upgrade can be scheduled to occur during off-peak or low-use hours. In one or more embodiments, a status of the update associated with one or more devices can be sent by the version agent 912 to the version management system 910. The status can indicate any of a success, a failure, a reason for a failure, any other status update information, or any combination thereof. For example, if a device indicates that a power level (for example, a battery life) is below a threshold, then the status of the upgrade can so indicate.

Figure 10:
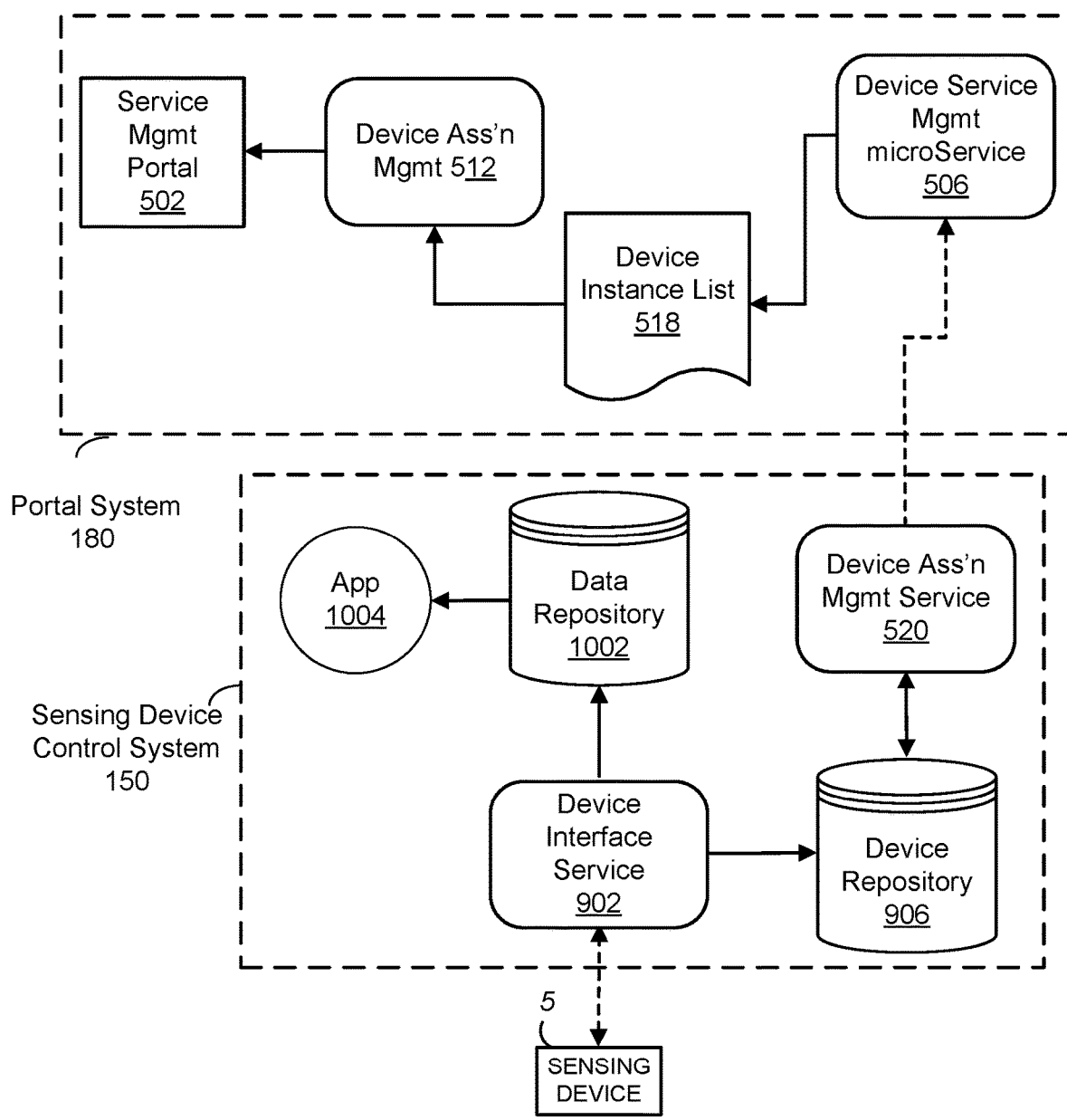
FIG. 10 illustrates a flow diagram for a status update, according to one or more aspects of the present disclosure.

FIG. 10 illustrates a flow diagram for a status update, according to one or more aspects of the present disclosure. A sensing device control system 150 can provide one or more status updates to the portal system 180. The one or more status updates can comprise any of an event notification (such as any of loss of connection to a device, connection to a device, any other event, or any combination thereof), a condition (such as any of a batter status, a failure of one or more components, any other condition, or any combination thereof), a trigger (such as any of an alarm, a semaphore, a threshold, or any combination thereof), any other status, or any combination thereof. In one or more embodiments, any one or more of the one or more status updates are sent from the sensing device control system 150 to the portal system 180 asynchronously. For example, if the battery status of a device (whether internal or external to the sensing device control system 150) falls below a threshold, the sensing device control system 150 via the device association management service 520 can send a status update to the portal system 180 via the device service management microservice 506. An alarm or other notification can be provided to the service management portal 502 so as to provide visual, audio, or both alert to a user. A data repository 1002 can comprise data from one or more devices, accessories, or both, such as biometric data received from a sensing device. For example, when a sensing device 5 (such an accessory) attempts to create a connection with the device interface service 902, then as discussed in FIG. 6, the sensing device 5 is validated. The validation response from the device interface service 902 can indicate that the validation failed and the sensing device 5 is not allowed to connect to the sensing device control system 150 or that the validation was successful and the sensing device 5 can connect to the sensing device control system 150 and send/receive data to/from the sensing device control system 150.

In one or more embodiments, the device interface service 902 receives sensor data from one or more devices, such as a network device 140, a sensor device 5, or both. The device interface service 902 can send the sensor data to the data repository 1002 so as to correlate the sensor data with a user, such as based on a user identifier 260, and to store the sensor data. Storing the sensor data can comprise storing any of the sensor data, a timestamp, an associated user identifier 260, any other information, or any combination thereof in a memory location local to or remote from the data repository 1002. The sensor data can be requested by and/or sent to the device interface service 902 based on any of a periodic basis, a timer, a semaphore, a trigger, an alarm, a setting, a threshold, a random basis, a real-time basis, any other basis, or any combination thereof. In one or more embodiments, the stored sensor data can be accessed by one or more applications 1004 that are authorized, verified, and/or otherwise credentialed (such as a whitelist application). In one or more embodiments, the device association management service 520 can provide sensor data to the device service management microservice 506 based on any of a request from the device service management microservice 506, a periodic basis, a timer, a semaphore, a trigger, an alarm, a setting, a threshold, a random basis, a real-time basis, any other basis, or any combination thereof.

In one or more embodiments, a device can be de-provisioned so that the association of the device to a specific sensing device control system 150 is removed. A user can via the service management portal 502 update an instance of a device in the device instance list 518 so as to remove the instance of the device. The update to the device instance list 518 is acknowledged or received by the device service management microservice 506 which reports the update to the device association management service 520 so that the device repository 906 can be updated by the sensing device control system 150. The device interface service 902 can receive a notification of the update and an application 1004 can be requested to remove any associated data. After the device has been removed from the device repository 906 (for example, removed from a whitelist), the sensing device control system 140 will not allow data received from the device to be stored or otherwise associated with a user identifier 260, a connection to be established with the device, or both.

While the present disclosure discusses an aging-in-place environment, the present disclosure contemplates any other environment that requires remote monitoring be provided within a secure and private network environment such that devices are provisioned so as to accurately and correctly be associated with a user and/or a location.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method of a portal system for validating a provisioning request for association of a device of a plurality of devices within a unit of a plurality of units, the unit associated with a user, in an environment, the method comprising:
   receiving the provisioning request for the device from a sensing device control system associated with the unit to associate the device with the sensing device control system, wherein the sensing device control system is in communication with the device;
   receiving from a device instance list of the portal system a policy associated with an instance of the device of the provisioning request, wherein the instance of the device is associated with the user and one or more supported entitlements;
   validating the provisioning request for association of the device to the sensing device control system based on the policy and the one or more supported entitlements; and
   sending the validation to the sensing device control system to cause an update to one or more association rules for the device in an association repository of the sensing device control system based on the validation.

2. The method of claim 1, further comprising:
   receiving at a device model list one or more provisioning requirements associated with a device; and
   wherein the validating the provisioning request is based on the one or more provisioning requirements.

3. The method of claim 2, wherein the one or more provisioning requirements comprises one or more allowed accessories.

4. The method of claim 1, further comprising:
   creating an instance of the device in the device instance list based on one or more provisioning requirements received from an instance management portal.

5. The method of claim 1, further comprising:
   receiving from the sensing device control system a service query; and
   sending a response to the service query to the sensing device control system, wherein the response comprises an updated policy.

6. The method of claim 1, further comprising:
   receiving at a service management portal information associated with the one or more supported entitlements; and
   wherein the policy is based on the one or more supported entitlements.

7. The method of claim 1, wherein the policy indicates one or more accessories associated with the instance of the device that are supported by the device and can be connected to the device.

8. A portal system for validating a provisioning request for association of a device of a plurality of devices within a unit of a plurality of units, the unit associated with a user, in an environment comprising:
   a memory storing one or more computer-readable instructions; and
   a processor configured to execute the one or more computer-readable instructions to:
      receive the provisioning request for the device from a sensing device control system associated with the unit to associate the device with the sensing device control system, wherein the sensing device control system is in communication with the device;
      receive from a device instance list of the portal system a policy associated with an instance of the device of the provisioning request, wherein the instance of the device is associated with the user and one or more supported entitlements;
      validate the provisioning request for association of the device to the sensing device control system based on the policy and the one or more supported entitlements; and
      send the validation to the sensing device control system to cause an update to one or more association rules for the device in an association repository of the sensing device control system based on the validation.

9. The portal system of claim 8, wherein the processor is further configured to execute the one or more computer-readable instructions to:
   receive at a device model list one or more provisioning requirements associated with a device; and
   wherein the validating the provisioning request is based on the one or more provisioning requirements.

10. The portal system of claim 9, wherein the one or more provisioning requirements comprises one or more allowed accessories.

11. The portal system of claim 8, wherein the processor is further configured to execute the one or more computer-readable instructions to:
    create an instance of the device in the device instance list based on one or more provisioning requirements received from an instance management portal.

12. The portal system of claim 8, wherein the processor is further configured to execute the one or more computer-readable instructions to:
    receive from the sensing device control system a service query; and
    send a response to the service query to the sensing device control system, wherein the response comprises an updated policy.

13. The portal system of claim 8, wherein the processor is further configured to execute one or more computer-readable instructions to:
receive at a service management portal information associated with the one or more supported entitlements; and
wherein the policy is based on the one or more supported entitlements.

14. The portal system of claim 8, wherein the policy indicates one or more accessories associated with the instance of the device that are supported by the device and can be connected to the device.

15. A non-transitory computer-readable medium of a portal system storing one or more computer-readable instructions for validating a provisioning request for association of a plurality of devices within a unit of a plurality of units, the unit associated with a user, in an environment, which when executed by a processor of the portal system, cause the portal system to perform one or more operations comprising:
receiving the provisioning request for the device from a sensing device control system associated with the unit to associate the device with the sensing device control system, wherein the sensing device control system is in communication with the device;
receiving from a device instance list a policy of the portal system associated with an instance of the device of the provisioning request, wherein the instance of the device is associated with the user and one or more supported entitlements;
validating the provisioning request for association of the device to the sensing device control system based on the policy and the one or more supported entitlements; and
sending the validation to the sensing device control system to cause an update to one or more association rules for the device in an association repository of the sensing device control system based on the validation.

16. The non-transitory computer-readable medium of claim 15, wherein the one or more computer-readable instructions when executed by the processor further cause the portal system to further perform the one or more operations comprising:
receiving at a device model list one or more provisioning requirements associated with a device; and
wherein the validating the provisioning request is based on the one or more provisioning requirements.

17. The non-transitory computer-readable medium of claim 16, wherein the one or more computer-readable instructions when executed by the processor further cause the portal system to further perform the one or more operations comprising:
creating an instance of the device in the device instance list based on one or more provisioning requirements received from an instance management portal.

18. The non-transitory computer-readable medium of claim 15, wherein the one or more computer-readable instructions when executed by the processor further cause the portal system to further perform the one or more operations comprising:
receiving from the sensing device control system a service query; and
sending a response to the service query to the sensing device control system, wherein the response comprises an updated policy.

19. The non-transitory computer-readable medium of claim 15, wherein the one or more computer-readable instructions when executed by the processor further cause the portal system to further perform one or more operations comprising:
receiving at a service management portal information associated with the one or more supported entitlements; and
wherein the policy is based on the one or more supported entitlements.

20. The non-transitory computer-readable medium of claim 15, wherein at least one of:
wherein the one or more provisioning requirements comprises one or more allowed accessories; and
wherein the policy indicates one or more accessories associated with the instance of the device that are supported by the device and can be connected to the device.

* * * * *